(12) United States Patent
Chandler et al.

(10) Patent No.: US 10,965,039 B1
(45) Date of Patent: Mar. 30, 2021

(54) SYSTEM AND METHOD FOR FLEET COMMAND AND CONTROL COMMUNICATIONS WITH SECONDARY RADAR FUNCTIONALITY USING 360° MULTI-BEAM HEMISPHERICAL ARRAY

(71) Applicant: LOCKHEED MARTIN CORPORATION, Bethesda, MD (US)

(72) Inventors: Cole A. Chandler, McKinney, TX (US); William G. Stein, II, Burleson, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 275 days.

(21) Appl. No.: 15/977,217

(22) Filed: May 11, 2018

(51) Int. Cl.

| | |
|---|---|
| *H01Q 21/24* | (2006.01) |
| *H01Q 3/04* | (2006.01) |
| *G01S 7/02* | (2006.01) |
| *G01S 7/36* | (2006.01) |
| *G01S 7/00* | (2006.01) |
| *G01S 13/74* | (2006.01) |

(52) U.S. Cl.
CPC ............ *H01Q 21/24* (2013.01); *G01S 7/006* (2013.01); *G01S 7/024* (2013.01); *G01S 7/36* (2013.01); *H01Q 3/04* (2013.01); *G01S 13/74* (2013.01)

(58) Field of Classification Search
CPC ................................. G01S 7/006; G01S 7/024
See application file for complete search history.

(56) References Cited

U.S. PATENT DOCUMENTS

| | | |
|---|---|---|
| 4,792,808 A | 12/1988 | Hlldebrand |
| 5,552,798 A | 9/1996 | Dietrich et al. |
| 5,642,122 A | 6/1997 | Lockie et al. |
| 5,650,788 A | 7/1997 | Jha |
| 5,764,192 A | 6/1998 | Fowler et al. |
| 5,995,062 A | 11/1999 | Denney et al. |
| 6,049,305 A | 4/2000 | Tassoudji et al. |

(Continued)

OTHER PUBLICATIONS

Balanis et al., "Uniform Circular Arrays for Smart Antennas," IEEE Antennas and Propagation Magazine, 47.4 (2005): 192-206, Abstract.

*Primary Examiner* — Marcus E Windrich
(74) *Attorney, Agent, or Firm* — Terry M. Sanks, Esq.; Beusse Sanks, PLLC

(57) ABSTRACT

A system comprising a hemispherical array antenna having a plurality of antenna elements comprising a set of baseline antenna elements arranged in a first 360° circular antenna array, a set of upper antenna elements arranged in a second 360° circular antenna array and latitudinally aligned with the baseline antenna elements, and a set of lower antenna elements arranged in a third 360° circular antenna array and latitudinally aligned with the baseline antenna elements. The system includes a fleet base station including a plurality of non-shared receiver channels coupled to and dedicated to a particular antenna element. The base station is configured to provide 360° of transmission/reception from horizon to zenith using the antenna elements for command and control fleet communications to and from mobile devices and to provide secondary radar functions using the fleet communications to track the mobile devices based on received signal characteristics received at the antenna elements.

19 Claims, 15 Drawing Sheets

(56) References Cited

U.S. PATENT DOCUMENTS

| | | |
|---|---|---|
| 6,295,035 B1 | 9/2001 | Holzheimer |
| 6,608,595 B1 | 8/2003 | Louzir |
| 7,315,239 B2 | 1/2008 | Cheng et al. |
| 8,159,394 B2 | 4/2012 | Hayes et al. |
| 8,976,066 B2 | 3/2015 | Manasson et al. |
| 9,170,348 B2 | 10/2015 | Abbaspour-Tamijani |
| 9,225,073 B2 * | 12/2015 | Culkin ............... G01S 13/4463 |
| 9,640,875 B2 | 5/2017 | Wilkinson et al. |
| 9,653,816 B2 * | 5/2017 | Ferreri .................. H01Q 1/286 |
| 9,696,419 B2 | 7/2017 | Mitchell |
| 9,810,774 B2 | 11/2017 | Wittenberg |
| 9,927,807 B1 * | 3/2018 | Ganjoo ................ H04W 76/15 |
| 2001/0050634 A1 * | 12/2001 | Laidig ................... H01Q 3/242 |
| | | 343/700 MS |
| 2012/0235858 A1 * | 9/2012 | Dougherty ............ H01Q 3/242 |
| | | 342/169 |
| 2013/0314280 A1 * | 11/2013 | Maltsev ................. H01Q 25/00 |
| | | 342/368 |
| 2015/0215011 A1 * | 7/2015 | Hartenstein ........... H01Q 1/521 |
| | | 375/267 |
| 2016/0282462 A1 * | 9/2016 | Pitts ..................... H01Q 21/064 |
| 2018/0227928 A1 * | 8/2018 | Kim ................... H04W 72/082 |

* cited by examiner

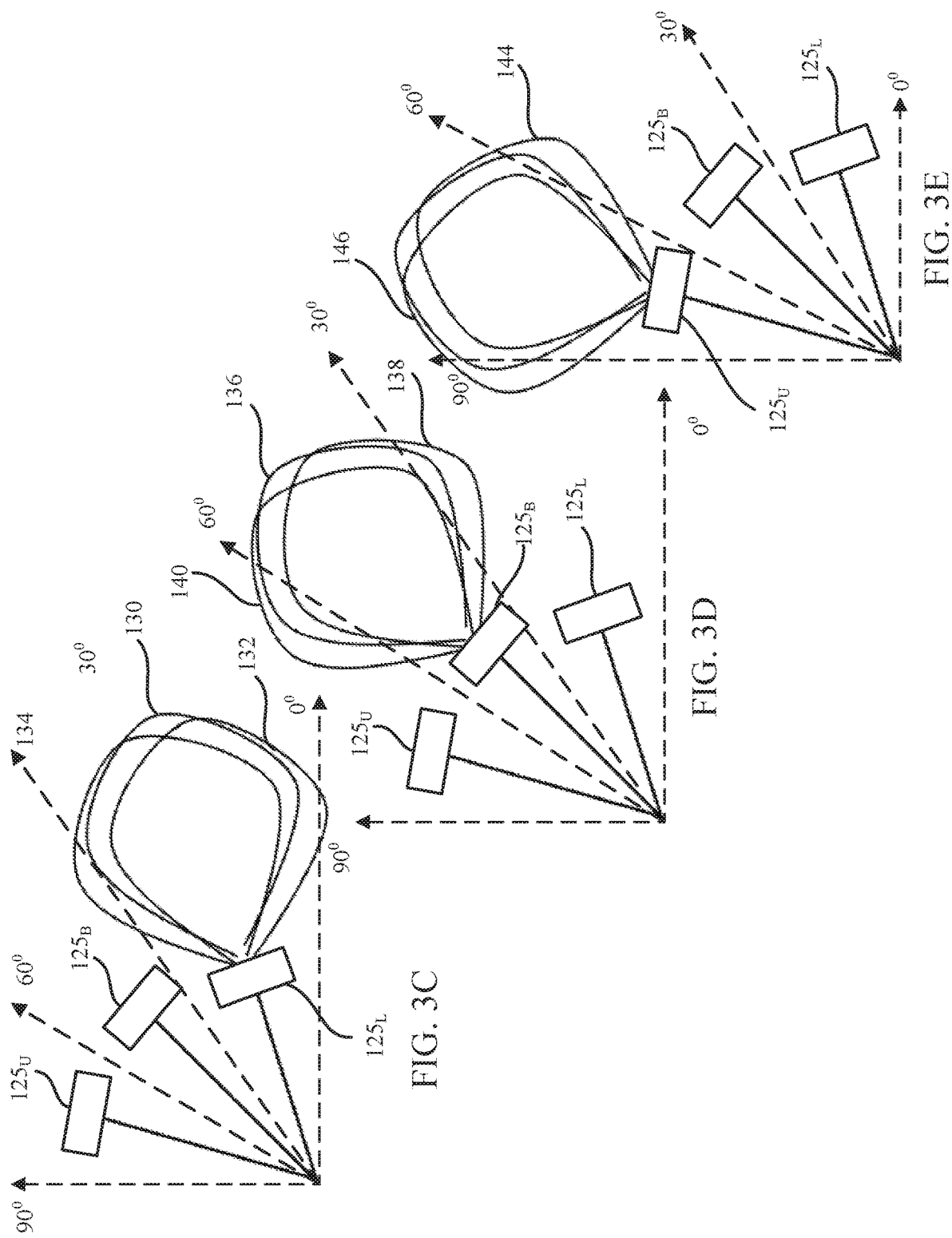

800

---

802 — Determining for each antenna element of the set of baseline tilted directive antenna elements, arranged in a baseline 360° circular array, a baseline azimuth difference sum beam, a baseline elevation difference sum beam and a baseline primary sum beam using baseline azimuth difference beams, baseline elevation difference beams and baseline primary beams from a corresponding different contiguous subset of baseline antenna elements

804 — Determining for each antenna element of the set of upper tilted directive antenna elements, arranged in an upper 360° circular array, an upper azimuth difference sum beam, an upper elevation difference sum beam and an upper primary sum beam using upper azimuth difference beams, upper elevation difference beams and upper primary beams from a corresponding different contiguous subset of upper antenna elements

806 — Determining for each antenna element of the set of lower tilted directive antenna elements, arranged in a lower 360° circular array, a lower azimuth difference sum beam, a lower elevation difference sum beam and a lower primary sum beam using lower azimuth difference beams, lower elevation difference beams and lower primary beam from a corresponding different contiguous subset of lower antenna elements

808 — Searching and tracking a plurality of mobile devices in response to a correlated azimuth and elevation based on received signal characteristics of the received signals from the baseline 360°circular array, the upper 360° circular array and the lower 360° circular array To FIG. 8B or 8C

FIG. 8A

SYSTEM AND METHOD FOR FLEET COMMAND AND CONTROL COMMUNICATIONS WITH SECONDARY RADAR FUNCTIONALITY USING 360° MULTI-BEAM HEMISPHERICAL ARRAY

BACKGROUND

Embodiments relate to system and method for fleet command and control communications with secondary radar functionality using a 360° multi-beam hemispherical array.

Mobile devices such as drones, unmanned aircraft vehicles, unmanned airborne vehicles or the like, rely on two-way communications for command and control with a wireless base station. However, these two-way communications may deteriorate from the flight of the mobile devices such that communications may be temporarily lost. Even if the communication link between a mobile device and a command and control base station are not lost, messages between the mobile device and base station may be corrupted as a result of signal interference. Corrupted messages may require retransmission which can waste time for the delivery of critical messages if the mobile device is tasked for a critical mission, for example.

SUMMARY

Embodiments relate to system and method for fleet command and control with secondary tracking using a 360° multi-beam hemispherical array.

An aspect of the embodiments includes a system comprising a multi-beam hemispherical array (MBHSA) antenna having a plurality of antenna elements comprising a set of baseline directive antenna elements arranged sequentially in a first 360° circular antenna array, a set of upper tilted directive antenna elements arranged sequentially in a second 360° circular antenna array and being latitudinally aligned with the set of baseline directive antenna elements, and a set of lower tilted directive antenna elements arranged sequentially in a third 360° circular antenna array and being latitudinally aligned with the set of baseline directive antenna elements. The system includes a wireless fleet base station including a plurality of non-shared receiver channels, each non-shared receiver channel being coupled to and dedicated to a particular antenna element of the first 360° circular array, the second 360° circular array and the third 360° circular array. The wireless fleet base station is configured to provide 360° of transmission and reception from horizon to zenith using the plurality of antenna elements for two-way command and control fleet communications to and from a plurality of mobile devices of a fleet and to provide secondary radar functions using the two-way command and control fleet communications to track the mobile devices based on received signal characteristics received at the plurality of antenna elements.

Another aspect of the embodiments includes an antenna comprising a plurality of baseline directive antenna elements arranged sequentially in a first 360° circular antenna array at a first tilt which receives signals in a first elevation coverage sector associated with the first tilt between horizon to zenith. The antenna comprises a plurality of upper tilted directive antenna elements arranged sequentially in a second 360° circular antenna array at a second tilt which receives signals in a second elevation coverage sector associated with the second tilt between the horizon to the zenith and latitudinally aligned with the plurality of baseline directive antenna elements. The antenna comprises a plurality of lower tilted directive antenna elements arranged sequentially in a third 360° circular antenna array at a third tilt which receives signal in a third elevation coverage sector associated with the third tilt between the horizon and the zenith and latitudinally aligned with the plurality of baseline directive antenna elements. The first 360° circular array, the second 360° circular array and the third 360° circular array are selectively controlled to provide 360° of reception of wireless signals from the horizon to the zenith from a plurality of mobile devices of a fleet in response to command and control fleet communications and to provide secondary radar functions using the command and control fleet communications to search for and track the plurality of mobile devices based on received signal characteristics associated with the first 360° circular array, the second 360° circular array and the third 360° circular array.

A further aspect of the embodiments includes a method comprising the steps of: a) determining for each antenna element of the set of baseline tilted directive antenna elements, arranged in a baseline 360° circular array, a baseline azimuth difference sum beam, a baseline elevation difference sum beam and a baseline primary sum beam using baseline azimuth difference beams, baseline elevation difference beams and baseline primary beams from a corresponding different contiguous subset of baseline antenna elements; b) determining for each antenna element of the set of upper tilted directive antenna elements, arranged in an upper 360° circular array, an upper azimuth difference sum beam, an upper elevation difference sum beam and an upper primary sum beam using upper azimuth difference beams, upper elevation difference beams and upper primary beams from a corresponding different contiguous subset of upper antenna elements; c) determining for each antenna element of the set of lower tilted directive antenna elements, arranged in a lower 360° circular array, a lower azimuth difference sum beam, a lower elevation difference sum beam and a lower primary sum beam using lower azimuth difference beams, lower elevation difference beams and lower primary beam from a corresponding different contiguous subset of lower antenna elements; d) searching and tracking a plurality of mobile devices in response to a correlated azimuth and elevation based on received signal characteristics of the received signals from the baseline 360° circular array, the upper 360° circular array and the lower 360° circular array; and e) repeating steps a)-d) for each subsequent instantiation.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 3C illustrates a block diagram of a set of three layers of antenna elements at 0° and a representative elevation reception coverage area for a lower antenna element;

FIG. 3D illustrates a block diagram of a set of three layers of antenna elements at 0° and a representative elevation reception coverage area for a baseline antenna element;

FIG. 3E illustrates a block diagram of a set of three layers of antenna elements at 0° and a representative elevation reception coverage area for an upper antenna element;

FIGS. 8A-8C illustrate a flowchart of a method for command and control of a plurality of mobile devices in a fleet with secondary radar functionality.

DETAILED DESCRIPTION

Figure 1:
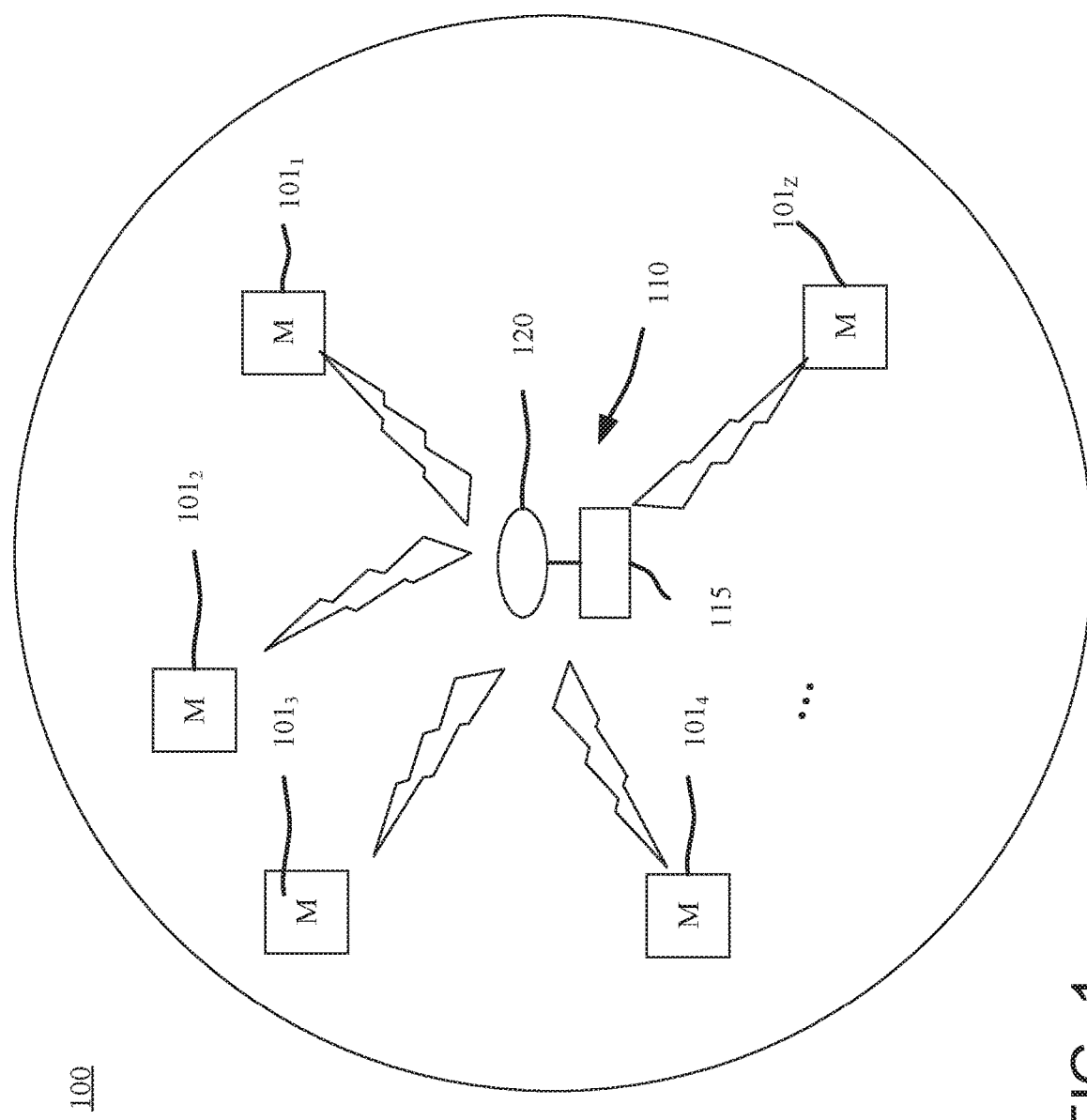
FIG. 1 illustrates a high-level block diagram of a command and control communications system for a fleet of mobile device.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a high-level block diagram of a command and control communications system 100 for a fleet of mobile device. The system 100 may comprise a command and control station 110 for controlling a fleet of mobile devices $101_1$, $101_2$, $101_3$, $101_4$, ..., $101_Z$ where Z is the number of fleet mobile devices. The command and control communications system 110 includes a wireless fleet base station 115 coupled to a multi-beam hemispherical array (MBHSA) antenna 120 which provides 360° of transmission and reception from horizon to zenith to facilitate fleet communications and secondary radar functions in support of command and control operations of the mobile devices $101_1$, $101_2$, $101_3$, $101_4$, ..., $101_Z$. The mobile devices $101_1$, $101_2$, $101_3$, $101_4$, ..., $101_Z$ may include one of a drone, an unmanned aircraft vehicle and missile. As will be seen from the description herein, the wireless base station 115 of system 100 is multi-functional. The wireless base station 115 may provide data-link operation for command and control and secondary radar operations for search and tracking. The wireless base station 115 may be stationary or mobile.

The wireless base station 115 may communicate using radio frequencies (RF) including radio frequencies such as without limitation ultra-high frequencies (UHF), and microwave frequencies.

Figure 2A:
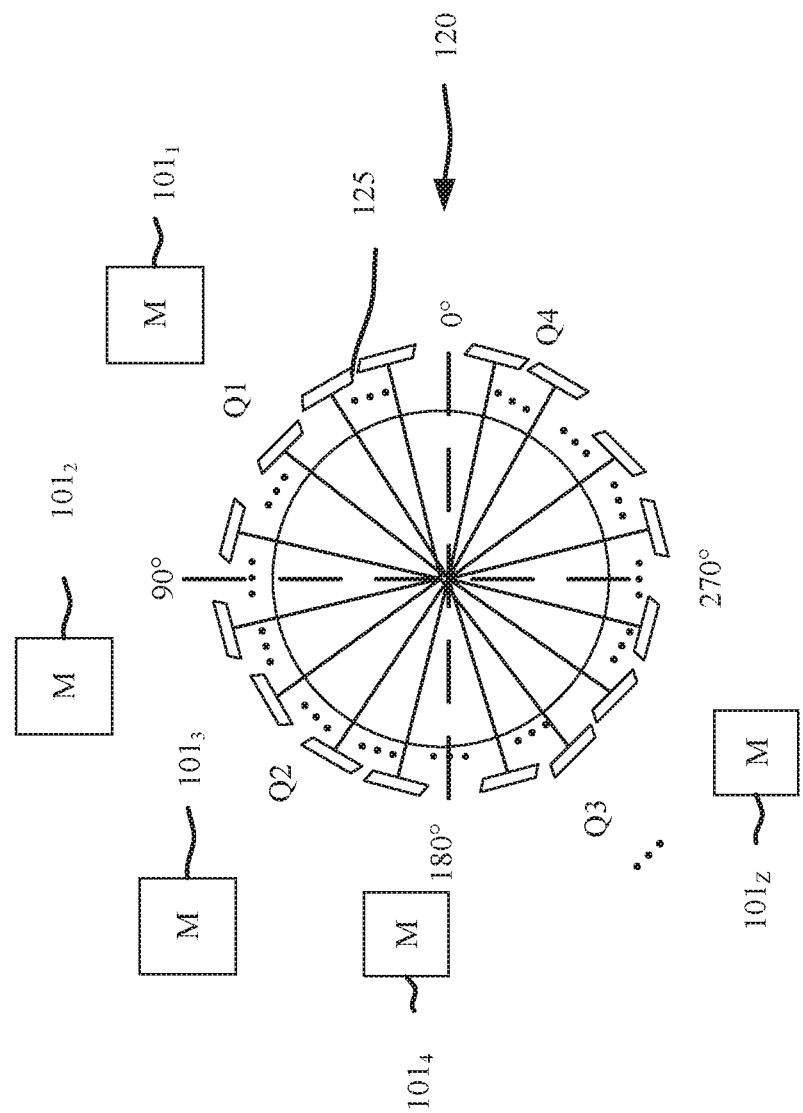
FIG. 2A illustrates a block diagram of a single circular row of antenna elements of a multi-beam hemispherical array (MBHSA) antenna with directed communications to mobile devices.
Figure 2B:
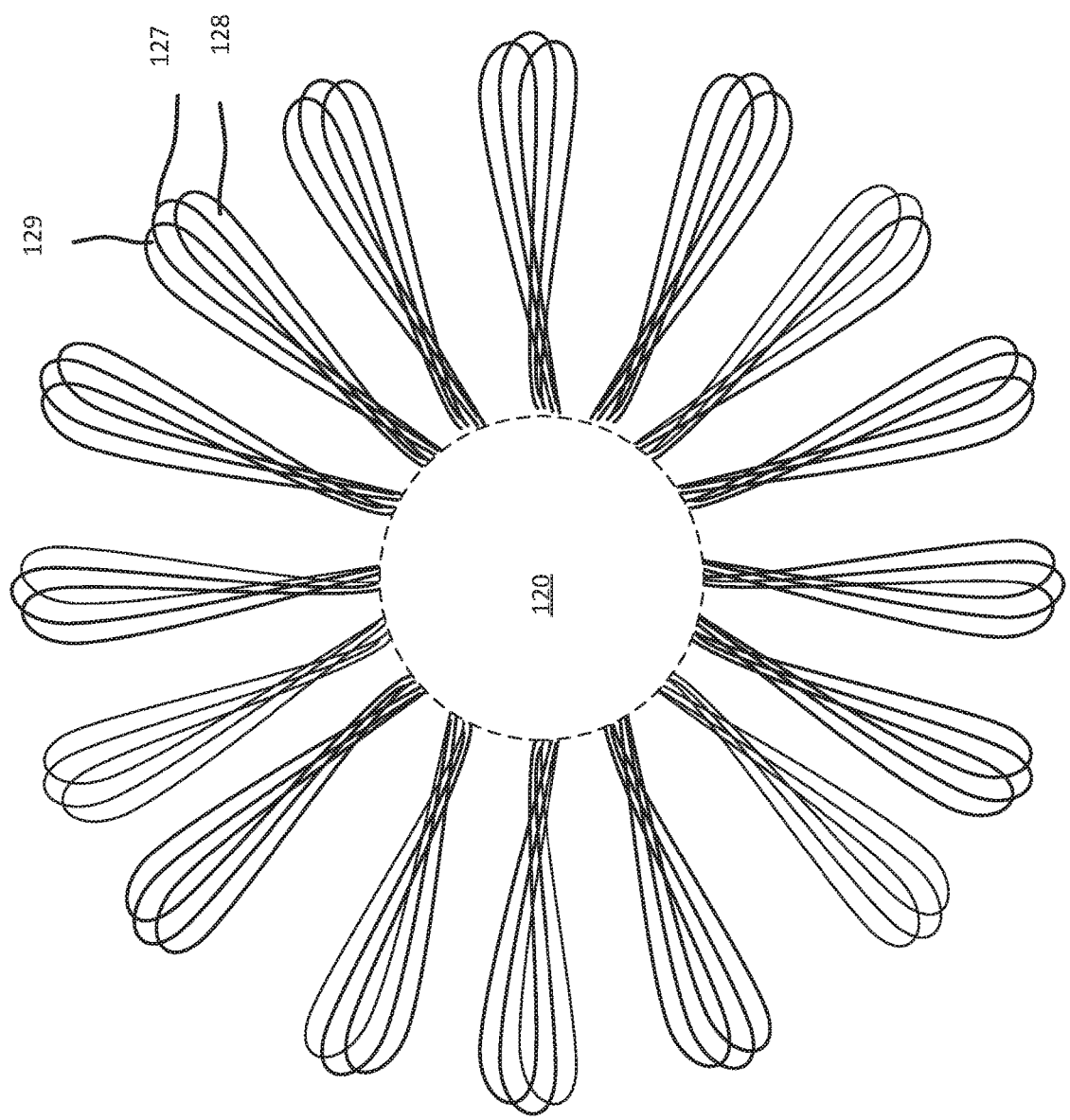
FIG. 2B illustrates, for a single circular row of antenna elements, a representative multi-beam azimuth reception pattern in 360°.

FIGS. 2A and 2B illustrate a block diagram of a single circular row of antenna elements of the multi-beam hemispherical array (MBHSA) antenna with directed communications to mobile devices and a representative multi-beam azimuth reception pattern in 360° for the single circular row. To simplify the drawing, on a few antenna elements of a single row is shown in each quadrant Q1 (0°-90°), Q2 (90°-180°), Q3 (180°-270°) and Q4 (270°-360°) of the MBHSA antenna 120 for illustrative purposes only. Each antenna element is denoted as 125. The multi-beam pattern of FIG. 2B illustrates, for each antenna element 125, a primary reception beam 127 and a pair of azimuth difference beams 128 and 129 to the right and left of the primary azimuth reception beam 127. For simplicity, some of the azimuth beams from adjacent antenna elements have been omitted to prevent crowding of the illustration. Assume that each single circular row of antenna elements includes Y antenna elements where Y is an integer number.

In FIG. 2B, there may be simultaneous, uniform reception coverage with minimal coupling due to antenna element directivity. At any particular instance in a reception mode, the system 100 may simultaneously receive and store in memory data representative of the received signals, for example, from all antenna elements arranged circularly in 360°. The system 100 is configured to perform beamforming commutations to develop a primary beam, a pair of offset azimuth difference beams, and a pair of offset elevation difference beams, as will be described in more detail, for each antenna element of the Y antenna elements of a layer or row based on the received signals of an instantiation. An instantiation may be sometimes referred to as a beamforming cycle wherein simultaneous reception signals on all antenna elements in each and every layer or row is used to create five component beams for each and every antenna element to estimate the azimuth and elevation of one or more of the mobile devices and direct command and control communications signal to the one or more mobile devices using dynamically generated transmission beam instantiation sector beam based on the estimate of the azimuth and the elevation of the one or more mobile devices.

A reception beamforming instantiation sector (RBIS) (FIG. 4A) may comprise a digitally-formed group of contiguous N antenna elements, where N is a predetermined integer fraction of the number Y antenna elements in a circular row. By way of non-limiting example, assume N=16. Each antenna element is associated with its own main RBIS of N contiguous antenna elements group, wherein a contiguous antenna elements group includes a main antenna element for which the primary sum beam, the pair of offset azimuth difference sum beams and the pair of offset elevation difference sum beams are formed. Each antenna element may also be a subordinate antenna element in overlapping RBISs of the same row, as will be described in relation to FIG. 4A. The received signals of the subordinate antenna elements may also be used in the formation of the primary sum beam, the pair of offset azimuth difference sum beams and the pair of offset elevation difference sum beams of main antenna elements of any overlapping RBIS.

For each antenna element, the primary reception beam is digitally formed by summing the reception signals of those antenna elements of the RBIS relative to a main RBIS antenna element. In other words, N=16 contiguous antenna elements (the RBIS contiguous antenna elements group), arranged in a circular array, may be digitally summed using primary beam weights to form a primary sum beam 127 for the main antenna element of the RBIS contiguous antenna elements group. The pair of offset azimuth difference sum beams, for the main antenna element of the RBIS, are formed by changing the weights applied to the received signals in memory using first and second azimuth forming weights to from azimuth difference sum beams 128 and 129 which is slightly offset relative to a mid-point of the antenna element, for example, to the right and to the left. Some beams have been omitted to prevent crowding of the drawing. Furthermore, the beams of one antenna element may overlap with the beams of another (adjacent) antenna element. At any one main antenna element, the primary sum beam, the pair of offset azimuth difference sum beams and the pair of offset elevation difference sum beams collectively may sometimes be referred to as the five (5) component beams formed for the main antenna element.

Figure 3A:
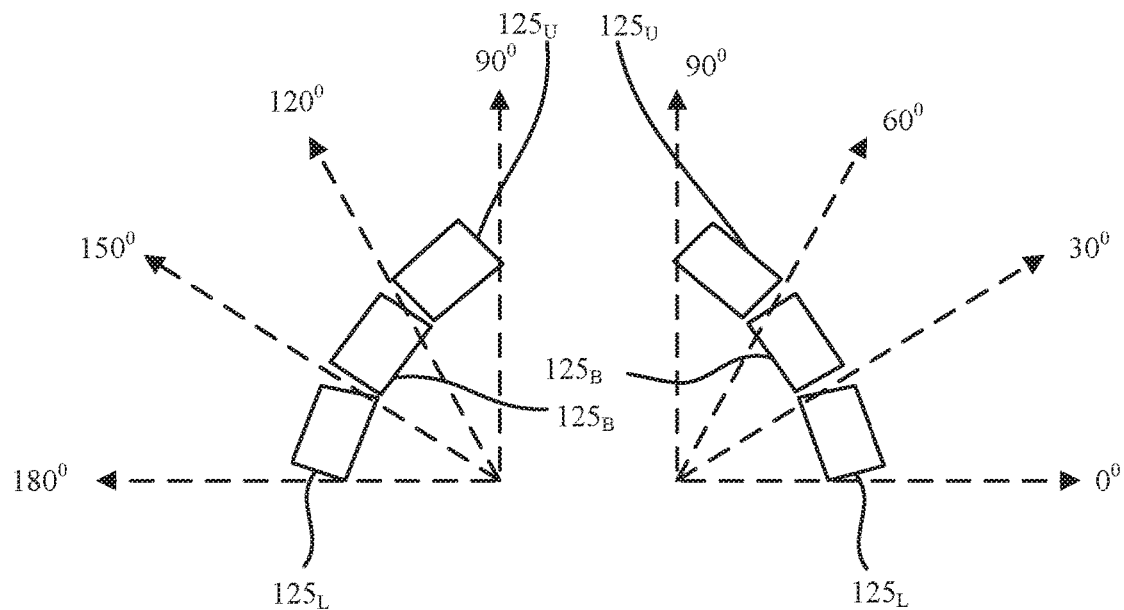
FIG. 3A illustrates a block diagram of a set of three layers of antenna elements at 0° and 180° of the MBHSA antenna.
Figure 3B:
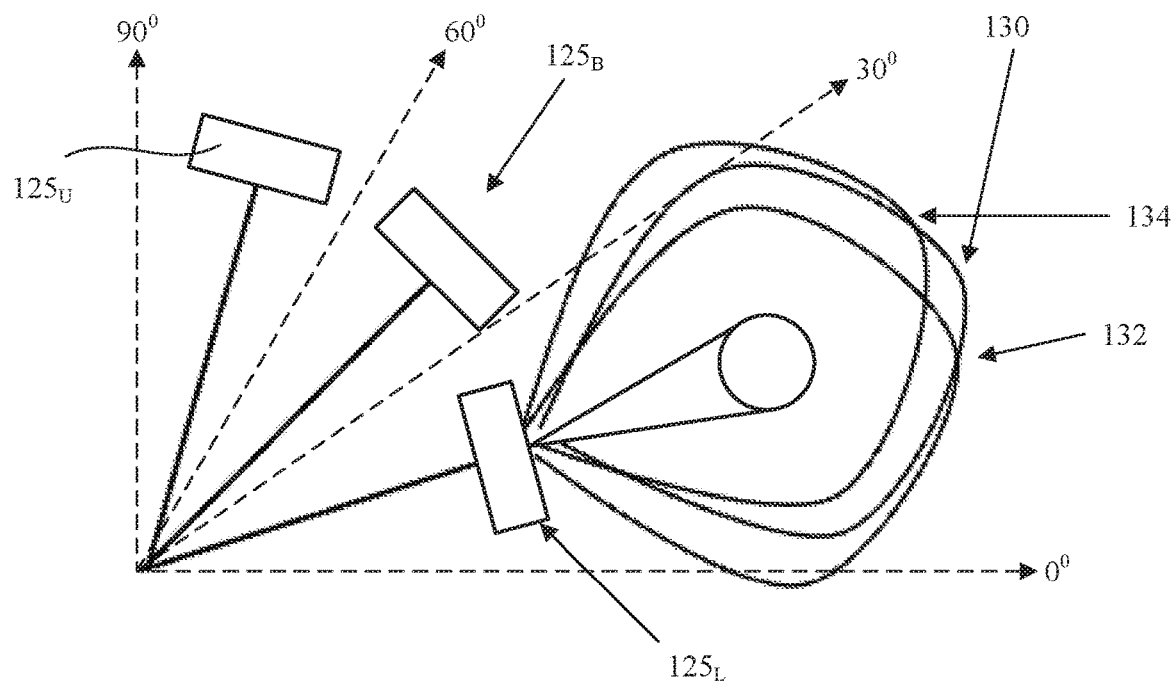
FIG. 3B illustrates a block diagram of a set of three layers of antenna elements at 0° and a representative elevation reception pattern for a lower antenna element.

FIGS. 3A-3B illustrate block diagrams of a set of three layers or rows of antenna elements at 0° and 180° of the MBHSA antenna and a block diagram of a set of three layers or rows of antenna elements at 0° and a representative elevation reception pattern for a lower antenna, element, respectively. FIGS. 3C, 3D and 3E illustrate block diagrams of a set of three layers or rows of antenna elements at 0° and representative elevation reception coverage areas for a lower antenna element, a baseline antenna element and an upper antenna element, respectively.

The MBHSA antenna 120 may comprise a plurality of baseline tilted directive antenna elements $125_B$, a first plurality of tilted latitudinal directive antenna elements $125_U$ and a second plurality of tilted latitudinal directive antenna elements $125_L$. The "B" denotes baseline. The "L" denotes latitudinally lower or aligned below the baseline in the latitudinal direction. The "U" denotes latitudinally upper or aligned above the baseline directive antenna element in the latitudinal direction. In some embodiments, the number of directive antenna elements may include N number of antenna elements per RBIS. The terms baseline, upper and lower are also just a frame of reference. Thus, the upper antenna elements may be the baseline antenna elements. Likewise, the lower antenna elements may be the baseline antenna elements as the antennas in each row are tilted relative to the other rows. Furthermore, while there is one row of upper antenna elements relative to the baseline antenna elements shown, the number of rows of antenna elements above and/or below the baseline antenna elements may be one or more rows.

Each upper tilted latitudinal directive antenna element $125u$ above a respective one baseline directive antenna element 125E is tilted relative to the orientation of said one baseline directive antenna element $125_B$. Each lower tilted latitudinal directive antenna element $125_L$ below a respective one baseline directive antenna element 125E is tilted relative to the orientation of said one baseline directive antenna element $125_B$. Furthermore, each lower tilted latitudinal directive antenna element $125_L$ is tilted relative to the upper tilted latitudinal directive antenna element $125_U$. Each upper tilted latitudinal directive antenna element $125_U$ above a respective one baseline directive antenna element $125_B$ is tilted.

The lower tilted latitudinal directive antenna element $125_L$, baseline directive antenna element $125_B$ and the upper tilted latitudinal directive antenna element $125_U$ latitudinally aligned may form an arc from approximately 0° to 90° along the zenith dimension.

In some embodiments, there may be an equal number of antenna elements per quadrant Q1 between 0°-90°; Q2 between 90°-180°; Q3 between 180°-270° and Q4 between 270°-360°. In 360°, there may be Y=40 antenna elements per row equidistantly arranged in a circular pattern with the same directive antenna tilt angle. In 360°, there may be Y=64 antenna elements per row equidistantly arranged in a circular pattern to form a circular array and each with the same directive tilt angle per the corresponding row. In some applications, there may be more than Y=64 antenna elements per row. By way of non-limiting example, the baseline directive antenna elements may transmit and receive in an elevation coverage sector of approximately 30°-60° relative to the horizon in 360° along the azimuth in the hemispherical coverage area. The baseline directive antenna elements may be tilted relative to the vertical plane.

If the number of antenna elements is Y=64, each antenna element has a reception range of approximately 5.625° along the azimuth dimension or horizon. If the number of antenna elements is Y=40, each antenna element may be configured with a reception range of approximately 9° along the azimuth dimension or horizon. The size of the antenna element may change based on at least the number Y of antenna elements in a circular row and the diameter of the MBHSA antenna 120.

The MBHSA antenna 120 may comprise, in the latitudinal direction relative to the baseline directive antenna elements, the same Y number of upper tilted latitudinal directive antenna elements $125u$ and Y number of lower tilted latitudinal directive antenna elements $125_L$, each of which is aligned with a corresponding baseline directive antenna element 125E to achieve hemispherical transmission and reception coverage pattern in 360°.

The lower tilted latitudinal directive antenna elements $125_L$ are tilted at an angle to receive signals in an elevation coverage sector between at least 0°-30°, latitudinally. All the lower tilted latitudinal directive antenna elements $125_L$ of the lower circular antenna array have the same tilt angle relative to the tilt angle of the baseline directive antenna elements. By way of non-limiting example, the lower tilted latitudinal directive antenna elements $125_L$ transmit and receive in an elevation coverage sector of approximately 0°-30° relative to the horizon in 360° along the azimuth in the hemispherical coverage area.

The upper tilted latitudinal directive antenna elements $125_U$ are tilted at an angle to receive signals in an elevation coverage sector between at least 60°-90°, latitudinally. All the upper tilted latitudinal directive antenna elements $125_U$ in the upper circular antenna array have the same tilt angle relative to the tilt angle of the baseline directive antenna elements. By way of non-limiting example, the upper tilted latitudinal directive antenna elements $125_R$ transmit and receive in an elevation coverage sector of approximately 60°-90° relative to the horizon in 360° along the azimuth in the hemispherical coverage area.

The baseline directive antenna elements 125E of the baseline circular antenna array are tilted at an angle to receive signals in an elevation coverage sector between at least 30°-60°, latitudinally. In some embodiments, the tilt angle may allow the reception range of the antenna elements aligned latitudinally to overlap to some degree. Hence, the latitudinally aligned antenna elements $125_L$, $125_B$ and $125_U$ in 360° in three rows provide a basis for hemispherical transmission and reception coverage. The description herein illustrates an embodiment which identifies the baseline antenna element to be in a row between an upper antenna element and a lower antenna element. The baseline antenna element may be the upper antenna element with two or more circular rows of antenna elements below the baseline antenna element. As can be appreciated, if four circular rows of latitudinally aligned antenna elements the elevation coverage section may be approximately or at least 0°-22.5°, 22.5°-45°, 45-67.5° and 67.5°-90°, for example, wherein each elevation coverage section may be configured to overlap in at least one adjacent elevation coverage section.

With reference to FIGS. 3B and 3C, the lower antenna element $125_L$ receives a primary beam 130 and elevation difference beams 132 and 134. With reference to FIG. 3D, the baseline antenna element 125E receives a primary beam 136 and, simultaneously, elevation difference beams 138 and 140. With reference to FIG. 3E, the upper antenna element 125u receives a primary beam 142 and, simultaneously, elevation difference beams 144 and 146. Hence, these beams and, specifically, the elevation difference beams associated with a particular main antenna element overlap the elevation coverage sectors of at least one adjacent elevation coverage area of the stacked circular antenna arrays. The elevation coverage areas may be configured to provide a full hemispherical reception and transmission coverage area 360° of the horizon or the azimuth dimension to the zenith.

The wireless base station 115 may be configured to develop digital azimuth difference beams and digital elevation difference beams for monopulse estimations, for example, as will be discussed in relation to FIG. 5.

The baseline antenna elements are directional antenna elements (tilted to match an elevation coverage sector and elevation inter-element spacing). The primary beam has an azimuth beam width (BW) matched to inter-element spacing. By way of non-limiting example, for a MBHSA antenna 120 with Y=64 antenna elements in 360°, the inter-element spacing may be 5.625°. For Y=40 antenna elements in 360°, the inter-element spacing may be 9°. The MBHSA antenna 120 may be compact in size and weight and can cover a wide area of angle space. These examples of Y=64 and Y=40 antenna elements per row are for illustrative purposes and should not be limiting in any way.

Figure 4A:
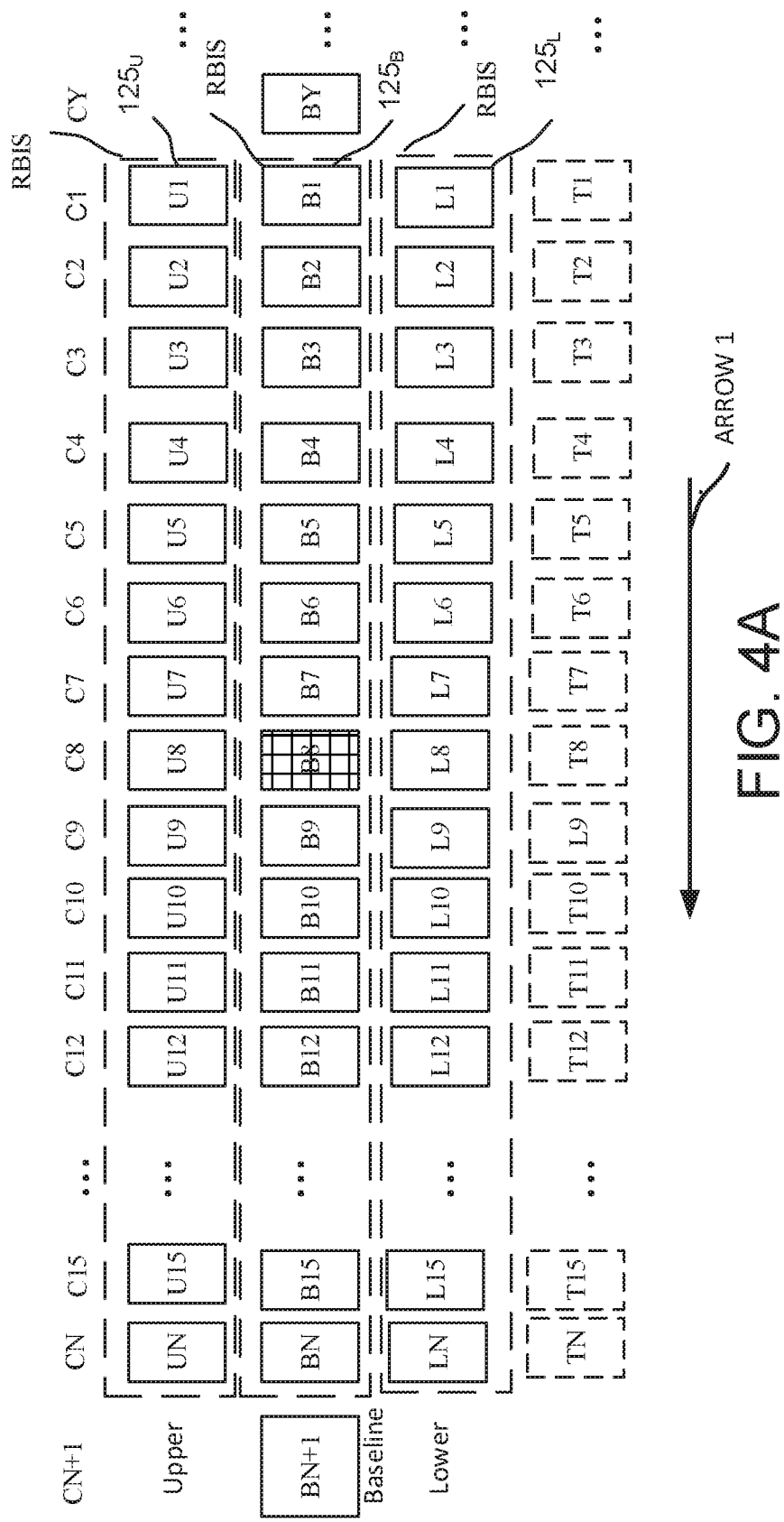
FIG. 4A illustrates a block diagram of a set antenna elements of multi-beam hemispherical array (MBHSA) antenna for a reception beamforming instantiation sector (RBIS) arranged in a linear pattern.

FIG. 4A illustrates a block diagram of a set antenna elements of multi-beam hemispherical array (MBHSA) antenna in a respective one RBIS of the baseline circular antenna array, a respective one RBIS of the lower circular antenna array and a respective one RBIS of the upper circular antenna array. In this example, assume that the RBIS (FIG. 4A) for any one main antenna element includes L=¼ of the Y antenna elements contiguously grouped in a circular row wherein L is a fraction such that N=Y*L is an integer number. Thus, if Y=64, then N=64×¼ or 16. Nonetheless, other fractions may be used resulting in N being an integer number. For this example, there are N baseline directive antenna elements $125_B$, N upper tilted latitudinal directive antenna elements $125_U$ and N lower tilted latitudinal directive antenna elements $125_L$ shown. Assume that the scanning of antenna elements begins at 0° corresponding to column C1 and proceeds in the direction of arrow ARROW 1 (counterclockwise) through column CN (C1-C12 and C15-CN shown), sequentially, to 90° for example, around the circular antenna array. The direction of the beamforming cycle may be described relative to a clockwise direction. This example is for illustrative purposes as the signal values are in memory and all RBISs may be formed simultaneously. This example described is provided to provide a frame of reference. Columns CY and CN+1 are also shown. By way of non-limiting example, if Y=40 and L=¼ then the number N=10. In yet another illustrative example, if Y=40 and L=⅕, then the number N=9.

In a beamforming cycle, the five (5) beam components for each and every antenna element is computed using a corresponding combination of N antenna elements for the RBIS associated with that antenna element set as the main antenna element.

For the sake of discussion, assume the current baseline antenna element 125E under evaluation is element B8 in column C8. Thus, when forming the primary sum beam, the pair of offset azimuth difference sum beams and the pair of offset of elevation difference sum beams, the digital primary, azimuth and elevation beamformer 560 (FIG. 5) may combine the received signals stored in memory 753 (FIG. 4) from N contiguous antenna elements which forms the RBIS for antenna element B8. When forming the five component beams using N=16 contiguous antenna elements to form the RBIS for antenna element B8 set as the main antenna element, the contiguous group of antenna elements may include antenna elements B1-BN (B1-B12 and B15-BN shown) wherein those stored received signals of antenna elements B1-BN (B1-B12 and B15-BN shown) are used as a basis of the five component beams of the main antenna element B8.

The primary sum beam for antenna element B8 is computed by summing the primary beam signals of antenna elements B1-BN (B1-B12 and B15-BN shown) to form the main primary beam for antenna element B8, wherein antenna element B8 is the main antenna element for the RBIS and the other antenna elements are subordinate antenna elements of the RBIS. The primary sum beam is a function of the received signals of antenna elements B1-BN (B1-B12 and B15-BN shown) weighted according to primary beam weights, shown in FIG. 5, configured to position the primary beam signal generally at a mid-point of the corresponding antenna elements. The offset azimuth difference beams include a left azimuth difference sum beam and a right azimuth difference sum beam for the main antenna element. The left azimuth difference sum beam is computed by summing the left azimuth beam signals, wherein the left azimuth beam signals are a function of the received signals of antenna elements B1-BN (B1-B12 and B15-BN shown) weighted with first azimuth weights configured to position the left azimuth beam signal slightly to the left of the mid-point of an antenna element. The right azimuth difference sum beam is computed by summing the right azimuth beam signals, wherein the right azimuth beam signals are a function of the received signals of antenna elements B1-BN (B1-B12 and B15-BN shown) weighted with second azimuth weights configured to position the right azimuth beam signals slightly to the right of the mid-point of each antenna element in the contiguous group of antenna elements of the RBIS.

The offset elevation difference sum beams include an upper elevation difference sum beam and a lower elevation difference sum beam for a main antenna element. The upper elevation difference sum beam is computed by summing the upper elevation beam signals, wherein the upper elevation beam signals are a function of the received signals of antenna elements B1-BN (B1-B12 and B15-BN shown) weighted with first elevation weights configured to position the upper elevation beam signal slightly above the mid-point of an antenna element. The lower azimuth difference beam is computed by summing the lower elevation beam signals, wherein the lower elevation beam signals are a function of the received signals of antenna elements B1-BN (B1-B12 and B15-BN shown) weighted with second elevation weight configured to position the lower elevation beam signals slightly below the mid-point of an antenna element.

The term "slightly" in relation to the mid-point of an antenna element may be a fraction between the mid-point and a corresponding edge (such as left edge, right edge, upper edge and lower edge) of the antenna element.

While the example described for an RBIS of main antenna element B8 was described using B1-BN where N=16, the RBIS may select antenna elements B2-B(N+1) (B1-B12 and B15-BN+1 shown), for example, for antenna element B8. Antenna element BN+1 is in column CN+1. Alternately, the RBIS of main antenna element B7 may select antenna elements BY-B15 (BY-B12 and B15 shown), for example. In some embodiments, the RBIS in the baseline layer based on main antenna element B8 overlaps with the RBIS in the upper layer based on main antenna element U8 using antenna elements U1-UN (U1-U12 and U15-UN shown), for example. Likewise, the RBIS in the baseline layer based on antenna element B8 overlaps with the RBIS in the lower layer based on the main antenna element L8 using antenna elements L1-LN (L1-L12 and L15-LN shown), for example. In some embodiments, the RBIS of each of the layers or rows may overlap and align, as the alignment of the upper antenna elements, baseline antenna elements and lower antenna elements serve to determine an elevation of a mobile device using for example parameters of the received signal such as without limitation a signal to noise ratio or amplitude. In another RBIS simultaneously formed, antenna elements B2-B(N+1) (B2-B12 and B15-BN+1 shown) may be grouped together for a main antenna element B9. In yet another RBIS simultaneously formed, antenna elements BY-B15 (BY, B1-B12 and B15 shown) may be grouped together for a main antenna element B7. Hence, Y RBIS s are formed simultaneously for each row.

In a single beamforming cycle, a wireless fleet base station 115 (FIG. 1) may simultaneously compute the five component beams for each and every antenna element of the Y antenna elements in the baseline layer or row by virtually forming Y different RBIS s, each with a different corresponding main antenna element selected in the baseline layer or row. Likewise, during the single beamforming cycle, the wireless fleet base station 115 (FIG. 1) may simultaneously compute the five component beams for each and every antenna element of the Y antenna elements in the upper layer or row by virtually forming Y different RBIS s, each with a different corresponding main antenna element selected in the upper layer or row. Furthermore, the wireless fleet base station 115 (FIG. 1) may simultaneously compute the five component beams for each and every antenna element of the Y antenna elements in the lower layer or row by virtually forming Y different RBISs, each with a different corresponding main antenna element selected in the lower layer or row. The Y RBISs of each layer is indexed by one antenna element either clockwise or counterclockwise.

The values representative of the five component beams of each main antenna element are stored in memory and may be combined for monopulse estimations and interference cancellation (nulling control).

The received signals at each antenna element according to various commutations in the digital beamformer 560 (FIG. 5) are generated to determine one or more of the location in the azimuth dimension of at least one communicating mobile device, the elevation of the at least one communicating mobile device, weights for controlling nulling associated with each baseline antenna element, upper antenna element and lower antenna element, and weights for refining the weights based on monopulse estimations for each baseline antenna element, upper antenna element and lower antenna element.

For example, assume that it is determined that a particular one mobile device located relative to the antenna 120 is tracked to the RBIS associated with column C2. Thus, the five component beams at baseline antenna element B2 in column C2, as the main antenna element of the baseline layer; the five component beams of the upper tilted latitudinal directive antenna element U2 in column C2 immediately above and latitudinally aligned with the current baseline antenna element B2; and the five component beams of the lower tilted latitudinal directive antenna element L2 in column C2 immediately below and latitudinally aligned the current baseline antenna element 125E may be used to determine an elevation of the mobile device. Thus, when switching to a transmission mode, the wireless fleet base station 115 (FIG. 1) may then select, for example, the upper tilted latitudinal directive antenna element U2 in column C2 if it is determined that the mobile device is elevated in the range of 60°-90°.

When searching for the mobile devices of the fleet, the wireless base station 115 of the command and control communications system 100 will step through the RBISs of the Y antenna elements being indexed or shifted by 1 for example.

As can be appreciated by the disclosure herein, a mobile device can be searched and found as messages are received at a particular one antenna elements. The elevation of the mobile device may be determined based on the signal to noise ratio on the latitudinally aligned antenna elements of a column.

Figure 4B:
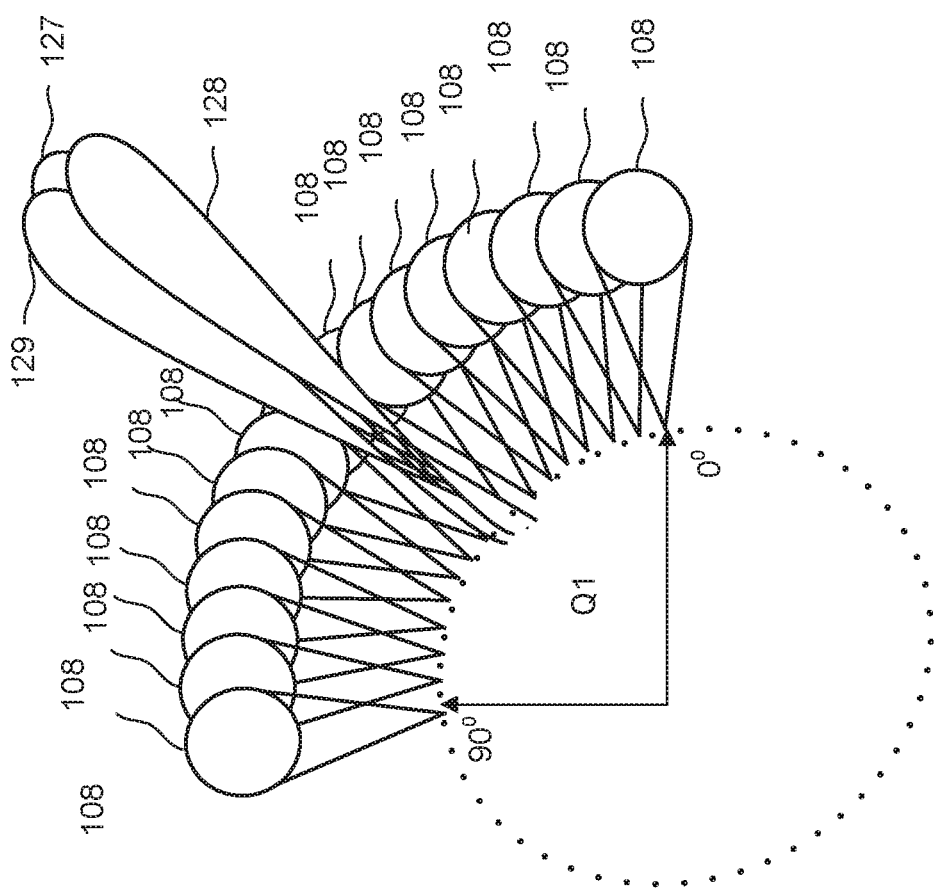
FIG. 4B illustrates a multi-beam hemispherical array (MBHSA) antenna with a primary beam and simultaneous azimuth difference beams oriented along the azimuth for a corresponding RBIS.

FIG. 4B illustrates a multi-beam hemispherical array (MBHSA) antenna with a primary sum beam 127 and, simultaneous, azimuth difference sum beams 128 and 129 oriented along the azimuth for a corresponding RBIS. The received signals represented as circular elements 108 are added together in a corresponding RBIS. Assume the main antenna elements of the RBIS shown is for the $8^{th}$ antenna element. Thus, the formed primary beam 127 and the difference azimuth beams 128 and 129 are generated by summing the received signals weighted with azimuth weights to create the difference sum beams at each antenna element in the RBIS. Likewise, the elevation difference sum beams (not shown) would be formed by summing the received signals represented at the circular elements 108 weighted with the elevation weights.

Figure 4C:
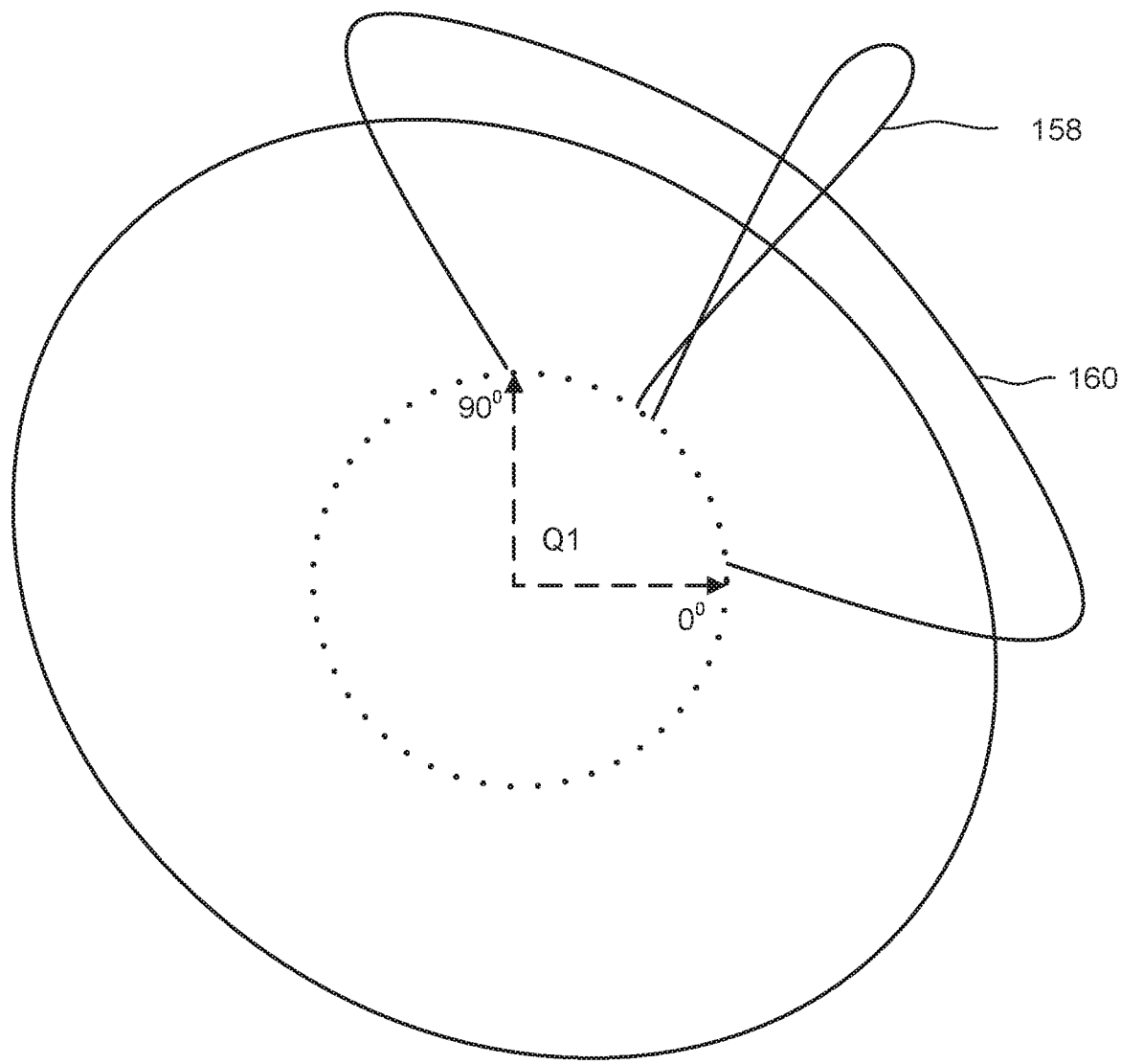
FIG. 4C illustrates a transmit beam from a respective one antenna element in respective one transmission beamforming instantiation section (TBIS) of the MBHSA antenna.
Figure 4D:
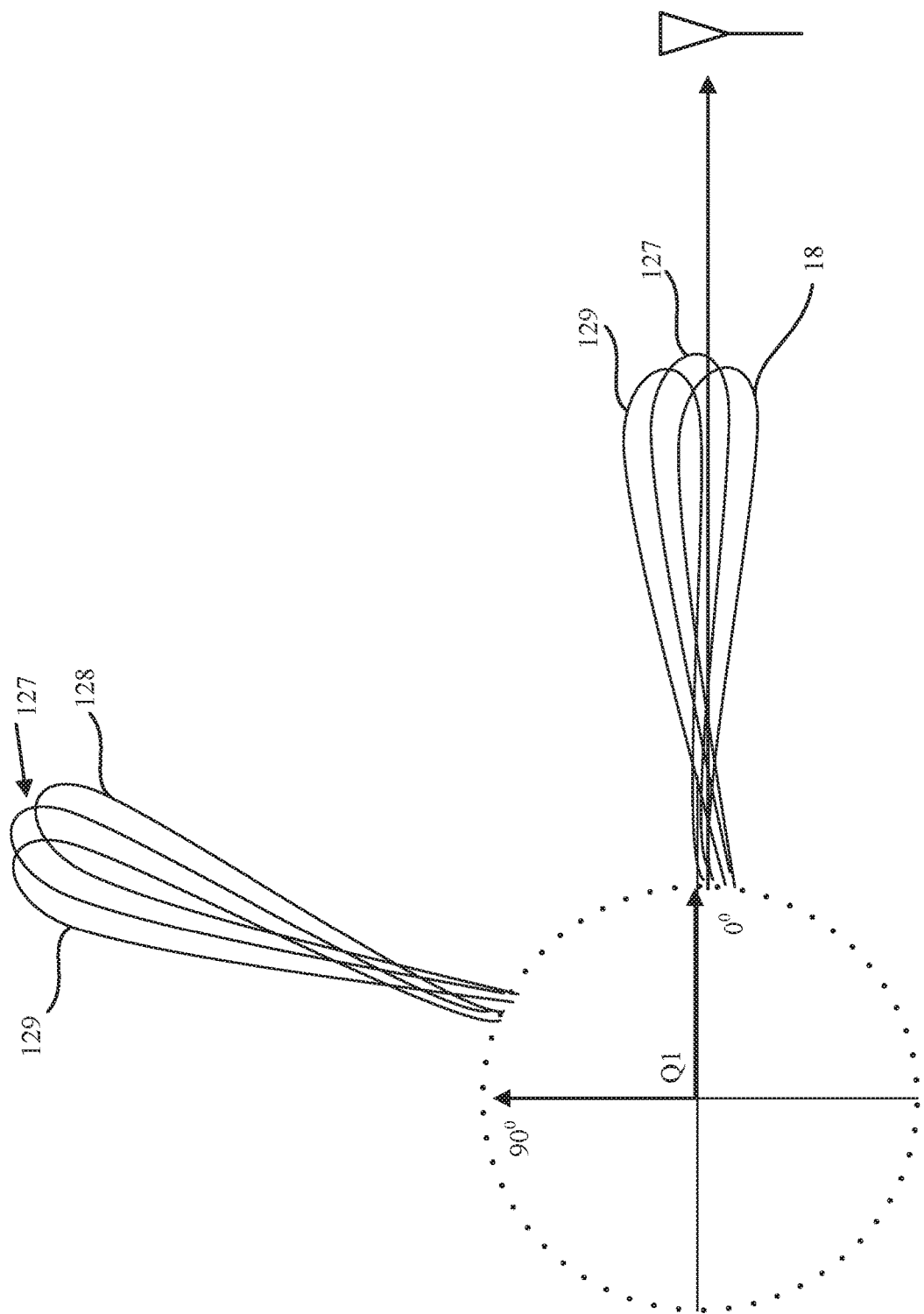
FIG. 4D illustrates simultaneous reception of a plurality of the primary beams and azimuth difference beams located in quadrant Q1 from two antenna elements.

FIG. 4C illustrates a transmit signal beam 158 from a respective one antenna element located, for example, in quadrant Q1 of the MBHSA antenna. FIG. 4D illustrates simultaneous reception of a plurality of the primary beams 127 and azimuth difference beams 128 and 129 located, for example, in quadrant Q1. The primary beams of FIGS. 4B and 4D are the same primary beams in FIGS. 3A-3E, for example.

Digital commutations of the primary sum beams in the scan cycles are configured to complete a 360° azimuth scan without pattern distortion. Inter-element spacing of the antenna elements is set to be grating lobe free for equivalent digital beamforming (DBF) scanning (~1 inter-element spacing). Interference signals are captured and measured with a sum beam. The location relative to the 360° and signal characteristics may be used for null placement in of a corresponding primary beam.

As shown in FIG. 4C, the antenna may be configured to provide a broad sectored or omni, nearly uniform transmit coverage area 160 is achieved since a plurality of the antenna elements may be selected. Furthermore, a highly directive transmit field represented by transmit signal beam 158 may be achieved with minimal leakage/coupling due to antenna element directivity of any one single antenna element in the baseline circular antenna array, lower circular antenna array and the upper circular antenna array. A plurality of antenna elements located in the transmit coverage area 160 may be added to create the larger transmit signal beam 158. Specifically, the transmit signal beam 158 may be selectively applied to a respective one antenna element with the desired directivity from the horizon to the zenith and within 360°. In some embodiments, a transmit signal beam 158 can be applied to all antenna elements of the antenna 120. In some embodiments, a subset of the antenna elements is selected to achieve the desired transmit coverage wherein a single transmit signal beam 158 with the same message may be applied to multiple selected antenna elements simultaneously. The antenna elements of the subset may be located anywhere in the 360° azimuth dimension in one of the elevation coverage sectors. In some embodiments, time division multiplex (TDM) may be used when transmitting signals to the fleet.

Figure 5:
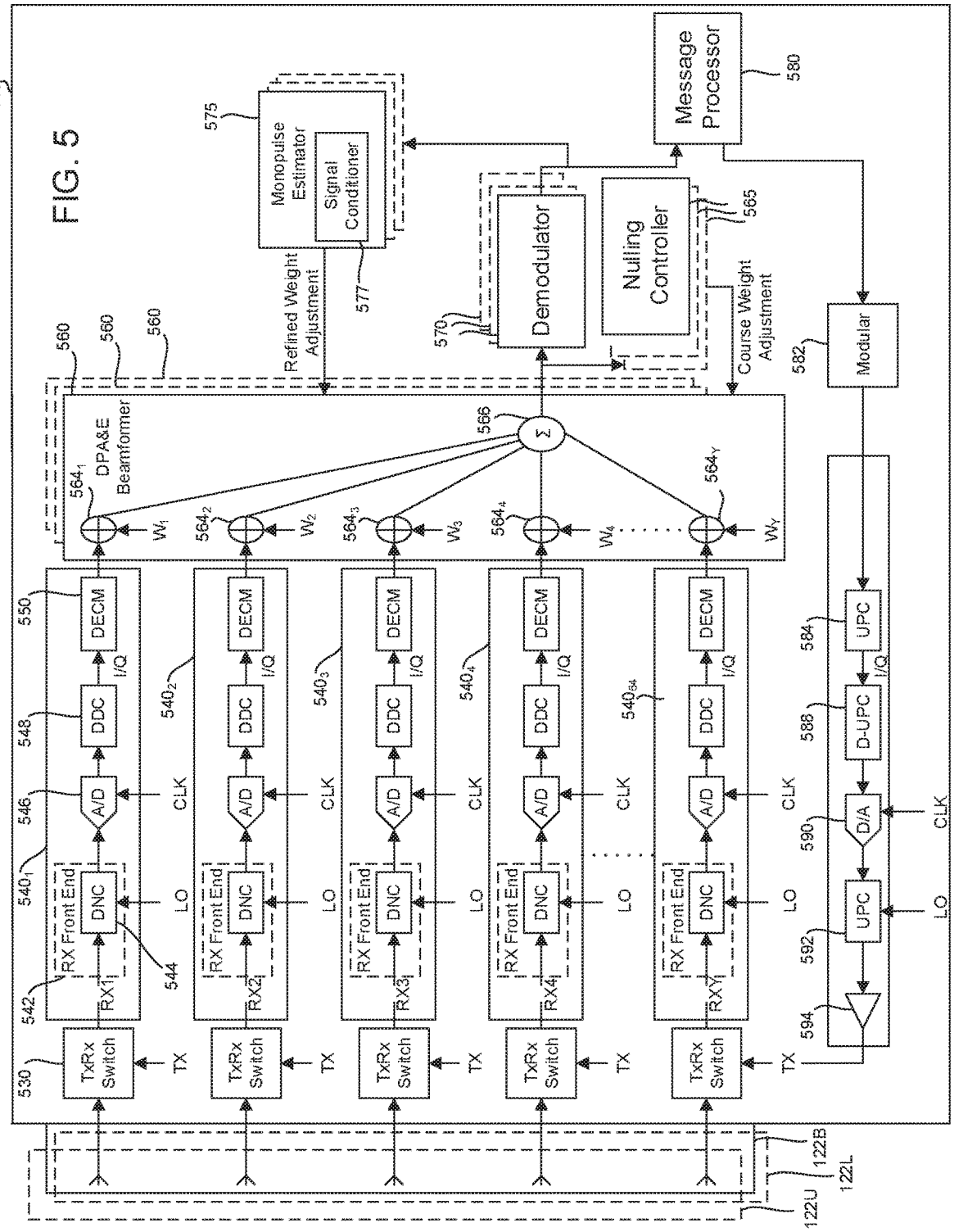
FIG. 5 illustrates a block diagram of the command and control communications system coupled to antenna elements for two-way communication with a fleet.

FIG. 5 illustrates a block diagram of the wireless base station 115 coupled to antenna elements for two-way communication with a fleet of mobile device via a multi-beam hemispherical array (MBHSA) antenna 120. The MBHSA antenna elements 525 relate the baseline antenna elements 125E for the purpose of discussion. The following description will be related to the receiver channels coupled to the baseline antenna elements 525 of the baseline circular antenna array $122_B$ for the sake of brevity and the communication paths the received baseline communication signals propagate. However, additional individual receiver channels are coupled to each lower antenna element of the lower circular antenna array. Still further, additional individual receiver channels are coupled to each upper antenna element of the upper circular antenna array. Since the operation of each circular antenna array, only one such circular antenna array and related receiver channels will be described. In general, the block diagram of the wireless base station 115 in FIG. 5 may be duplicated for the lower circular antenna array and also for the upper circular antenna array. However, only one transmit channel may be selectively coupled to any one of the antenna elements of the lower circular antenna array and the upper circular antenna array.

As for the command and control operations performed by the wireless base station 115, multiple simultaneous diverse beams (e.g., search and track) may be generated using different antenna elements.

The base station 115 does not require analog beamforming networks, lenses etc. to generate the sum beams, elevation difference beams and azimuth difference beams, for example. Instead, the base station 115 may use a digital beamformer as will be described in relation to FIG. 5.

Each respective one baseline antenna element 525 is coupled to a respective different one receiver channel $540_1$, $540_2$, $540_3$, $540_4$, ..., $540_Y$ configured to communicate with at least one mobile device $101_1$, $101_2$, $101_3$, $101_4$, ..., $101_Z$ (FIG. 1). In this example, Y equals 64. The receiver channel may be dedicated to a baseline antenna element for a one-to-one correspondence. Since each receiver channel is essentially the same, only one such receiver channel will be described in detail.

Figure 7:
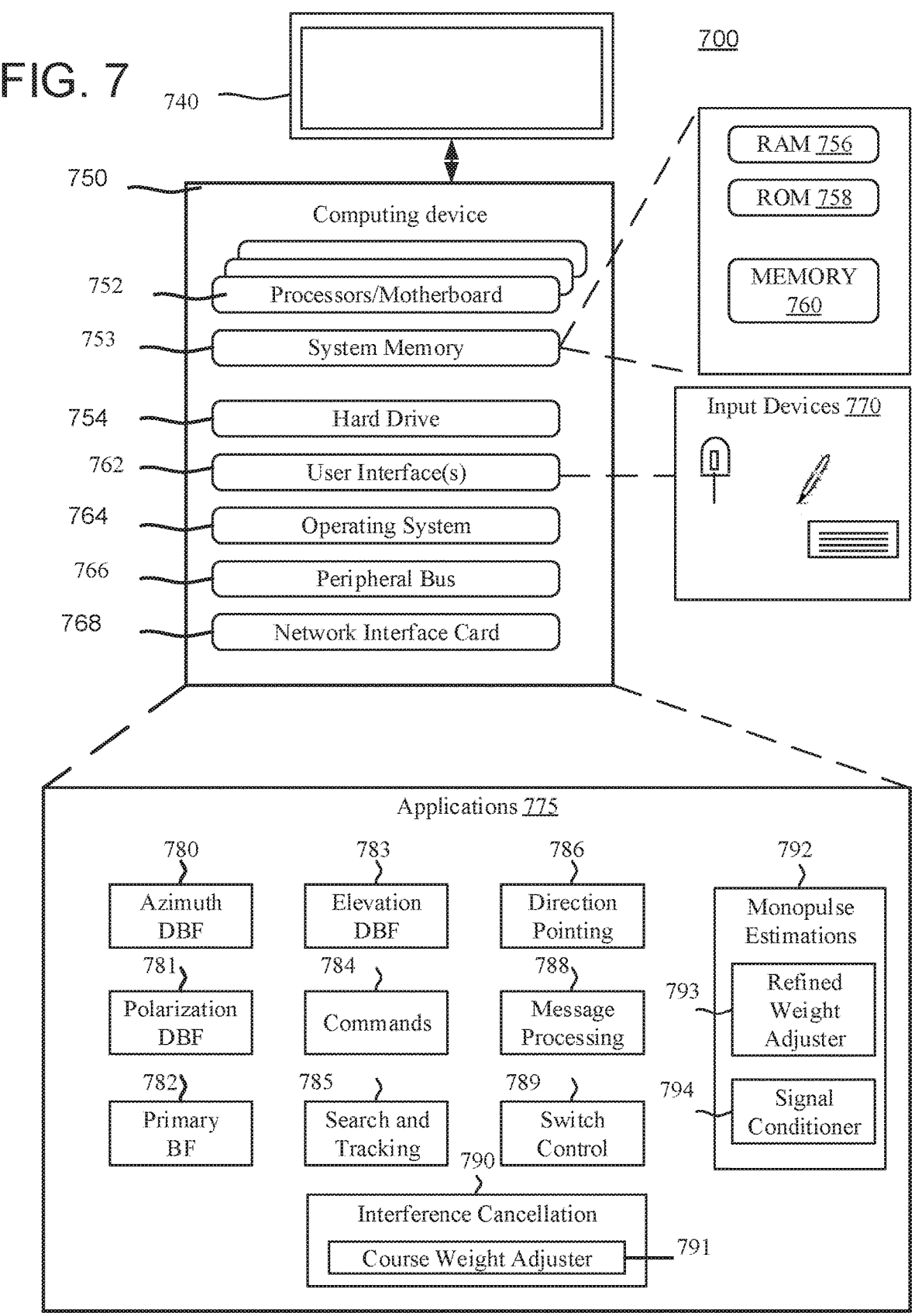
FIG. 7 illustrates a computing device for use in the base station of the command and control communications system.

The receiver channel $540_1$ may comprise a receiver front end 542. The receiver front end 542 may include circuits which are not shown. For the sake of brevity, the receiver front end 542 is shown as including a down converter (DNC) 544 which receives a local oscillator (LO) signal such as from a local oscillator (not shown). The DNC 544 may include a mixer which receives the LO signal. The receiver channel 540 may include an analog-to-digital (A/D) converter 546 configured to convert the received analog communication signal from a mobile device, for example, to a digital signal. The A/D converter 546 may be configured to receive a clock (CLK) signal such as from the computing device (FIG. 7).

The receiver channel $540_1$ may include a digital down converter (DDC) 548 which down converts the received digital signal from the A/D converter 546. The output of the DDC 548 may include in-phase (I) and quadrature (Q) digital signals. A decimator (DECM) 550 may receive the in-phase (I) and quadrature (Q) digital signals and perform decimation to reduce the sampling rate of the received the in-phase (I) and quadrature (Q) digital signals. The output of the DECM 550 may be processed by a digital primary, azimuth and elevation (DPA&E) beamformer 560. The DPA&E beamformer 560 may include designated multiplier $564_1$ configured to multiply the output from the DECM 550 of the receiver channel $540_1$ with an adjustable weight $W_1$ to form a weighted digital receiver signal. Each receive channel $540_1$, $540_2$, $540_3$, $540_4$, ..., $540_Y$ has a corresponding weight $W_1$, $W_2$, $W_3$, $W_4$, ..., $W_Y$. The DPA&E beamformer 560 may include a summer 566 which is configured to dynamically sum selected ones of the weighted receiver signals of commutated receiver channels stored in memory (FIG. 7) in a particular beamforming instantiation cycle to create the five component beams for the Y main antenna elements, as previously described. A DPA&E beamformer 560 is also provided for the receiver channels associated with the lower circular antenna array. Likewise, a DPA&E beamformer 560 may be provided for the receiver channels associated with the upper circular antenna array.

The DPA&E beamformer 560 applies weights to the receiver channels wherein the weights may include primary beam weights to create a primary sum beam of an RBIS, azimuth difference beam weights to create azimuth difference sum beams, and elevation difference beam weights to create elevation difference sum beams per RBIS.

The MBHSA antenna 120 may be configured with the ability to form monopulse angle estimations and adaptive interference cancellation (nulling). Specifically, a nulling controller 565 may receive the output of the DPA&E beamformer 560 to determine course weight adjustments adaptively for interference cancellation. The DPA&E beamformer 560 may comprise a plurality of DPA&E beamformer 560 for each commutation calculated per different cycle. The output of each DPA&E beamformer 560 may be demodulated by a corresponding demodulator 570. The base station 115 may include a demodulator 570 for the receiver channels associated with the lower circular antenna array and a demodulator for the receiver channels associated with the upper circular antenna arrays.

A monopulse estimator 575 may receive the demodulated output of demodulator 570 for the receiver channels associated with the baseline circular antenna array. The demodulated signal may be conditioned by signal conditioner 577. By way of non-limiting example, the signal conditioner 577 may increase the signal to noise ratio of the demodulated signal to improve the monopulse estimation. The monopulse estimator 575 generates a refined weight adjustment for the DPA&E beamformer 560. The demodulated signal may be received by a message processor 580 to determine the message embedded in the received transmission from a respective one mobile device. Each datalink message burst from a mobile device may be captured in memory. All beamforming, position estimation, demodulation etc., simultaneously or sequentially performed on the digital signal data stored in memory (FIG. 7). A monopulse estimator 575 may be provided to generate refined weight adjustments for the receiver channels associated with the lower circular antenna array. Also, a monopulse estimator 575 may be provided to generate refined weight adjustments for the receiver channels associated with the upper circular antenna array.

The wireless base station 115 may comprise at least one transmit channel 584. The transmit channel 584 may include to receive an output from modulator 582, an interpolator (INTP) 586 may convert a received sample digital signal to a higher sample rate digital signal. The INTP 586 may perform up-sampling. The transmit channel 584 may include a digital up-converter (D-UPC) 588. A digital-to-analog (D/A) converter 590 may receive the output from the D-UPC 588 and convert the digitally upconverted signal to an analog signal. The D/A converter 590 may receive a clock (CLK) signal. An analog up-converter (UPC) 592 may up-convert the output signal from the D/A converter 590. The UPC 592 may receive a local oscillator signal from a local oscillator (not shown). A power amplifier 594 may amplify the received up-converted signal from UPC 592. The output of the power amplifier 594 may be coupled to a respective one baseline antenna element via a transmit/receive (Tx/Rx) switch 530 coupled to a respective one the antenna element in the baseline circular antenna array. The illustration includes one transmit channel 582 coupled to a plurality of switched 530 such that each switch 530 is coupled to one transmit channel 582, a respective one antenna 525 of the baseline circular antenna array and a corresponding one receiver channel dedicated to the respective one antenna. While the illustration includes switches 530, such switches 530 may be replaced with circulators, duplex couplers, multiplex couplers, or other antenna couplers which allow at least one transmitter and at least one receiver to selectively alternate transmission and reception from a single antenna element.

In some embodiments, each switch of the switches 530 may be switched between a dedicated one receiver channel, a dedicated one baseline antenna element and a dedicated one transmit channel to receive and transmit with different mobile devices using the antenna elements. Likewise, a corresponding switch of a plurality of switches is associated with each antenna element of the lower circular antenna array and its associated receiver channel. The switch may be controlled to transmit through the coupled antenna element a transmit signal from one transmit channel for all receiver channels for the lower antenna elements. Alternately, the switch may be controlled to switch between a dedicated transmit channel and a dedicated receiver channel to selectively transmit command and control signals through any one or more of the lower antenna elements of the lower circular antenna array. A corresponding switch of a plurality of switches may be associated with each antenna element of the upper circular antenna array and its associated receiver channel. The switch may be controlled to transmit through the coupled antenna element a transmit signal from one transmit channel for all receiver channels for the upper antenna elements. Alternately, the switch may be controlled to switch between a dedicated transmit channel and a dedicated receiver channel to selectively transmit command and control signals through any one or more of the upper antenna elements of the upper circular antenna array.

The switches may be used to transmit a command and control signal or a search signal to each and every mobile device of the fleet to search for the mobile devices as well as control the mobile devices. Once a mobile device receives the command and control signal or a search signal, the mobile device would develop a response packet with a message to be processed by the base station 115. The packet reception characteristics from the mobile device are evaluated to determine the azimuth and elevation of the mobile device to provide the secondary radar function. Additionally, once a mobile device is located, a particular antenna element of the stacked circular antenna is selected for optimum communication with the responding mobile device. The responding mobile device may be further tracked for further communications using the stacked circular antenna arrays to communicate ongoing command and control signals. This process of searching, tracking and command and control is accomplished using base station 115 for the plurality of mobile devices in the fleet.

As can be appreciated by the description herein, all the mobile devices may be tracked by the MBHSA antenna 120. However, each mobile device may be at different elevations. Thus, the stacked circular antenna arrays allow the base station 115 to determine which elevation coverage section the mobile device is communicating within based on signal to noise characteristics. Then, the antenna element for the elevation coverage section can be selected within the hemispherical coverage area at least one antenna element in the azimuth for transmission selected to correspond to a direction or location of the mobile device relative to the MBHSA antenna 120, as will be described in more detail herein.

In operation, the wireless base station 115 may transmit a message, command or control signal to a respective one mobile device, using transmit channel 584 or a designated transmit channel associated with a respective one receiver channel. The wireless base station 115 may receive messages from a respective one mobile device in response to messages sent from the base station 115 or in response to mobile specific messages associated with actions performed by the mobile device, current operational state of the mobile device and/or motion of the mobile device, by way of non-limiting example.

The messages transmitted by the wireless base station 115 may control the mobile device, a current operation state of the mobile device and/or motion of the mobile device, by way of non-limiting example. However, as these messages are received by a mobile device, the responding packet from the mobile device is evaluated for adaptive interference and monopulse estimation by the wireless base station 115. Further or subsequent communications between the wireless base station 115 and mobile device are directed to a respective antenna element to which two-way communications between the mobile device and the wireless base station 115 may be improved over two-way communications between the mobile device and the wireless base station 115 on another antenna element. As the mobile device moves, the wireless base station 115 uses the secondary radar functionality to track the mobile device based on message (propagation) delivery delays of subsequent communications between the mobile device and the wireless base station 115. Furthermore, a different antenna element may be selected based on the motion of the mobile device as the mobile device moves from one RBIS to another RBIS as a result of its flight path as determined in subsequent instantiations of a beamforming cycle.

As can be seen from the description herein, the wireless base station 115 includes a plurality of antenna elements configured for two-way communications. Each different antenna element may be coupled to a different dedicated receiver channel for a receive mode of operation. However, each antenna element may be switched to transmit a message, command and control signal or tracking signal in a transmit mode from a common transmit channel shared by all the antenna elements of a particular circular antenna array. In some embodiments, each antenna element may be coupled to a dedicated transmit channel which is not shared with other antenna elements. In some embodiments, the MBHSA antenna 120 may include a circular antenna array of transmit antenna elements. For example, the circular antenna array may include Y number of transmit antenna elements. The circular antenna array may be located below the lower circular antenna array or above the upper circular antenna array, by way of non-limiting examples. In FIG. 4A, the dashed boxes T1-TN (T1-T12 and T15-TN shown) denote discrete directive transmit antenna elements of an optional circular antenna array. The transmit antenna element aligned with a particular column of lower antenna, baseline antenna and upper antenna elements may be shared by those antenna elements of the column. In some embodiments, the wire base station 115 may include simultaneously two-way communications from a transmit antenna element of a column and a selected one of aligned lower antenna element, baseline antenna element and upper antenna element of the same column.

The elevation angle corresponds to the angle relative to the horizon in a latitudinal direction. The azimuth angle corresponds to the angle to the left or right. Hence, the five component beams of each antenna element may determine the azimuth angle and the elevation angle.

The combination of digital beamforming with digital commutation provides wide elemental spacing with grating free scanning operation. This technology could be extended to provide some surveillance capability.

The individual antenna element selectivity or digital combination of antenna elements may be used to form a tailored pattern for a given pointing direction toward a mobile device. Furthermore, digital commutation and digital beamforming on a receive signal for a transmitted signal provides spurious signal rejection improvements. ((Any contiguous group of antenna elements can form an RBIS which has approximately 360 azimuthal degrees of freedom with the precision of monopulse angle estimation, the interference source location can be directly measured in that particular mainlobe and the resulting angle can be utilized in the weighting of the desired communication mainlobe RBIS to position a null in the precise interference direction while optimizing the directionality in the desired communication direction. The interference could be from other intended communications sharing that time or frequency or intentional interference (jamming).) If the signal to noise ratio is low meaning more noise or interference at any particular antenna element may be corrected.

Figure 6:
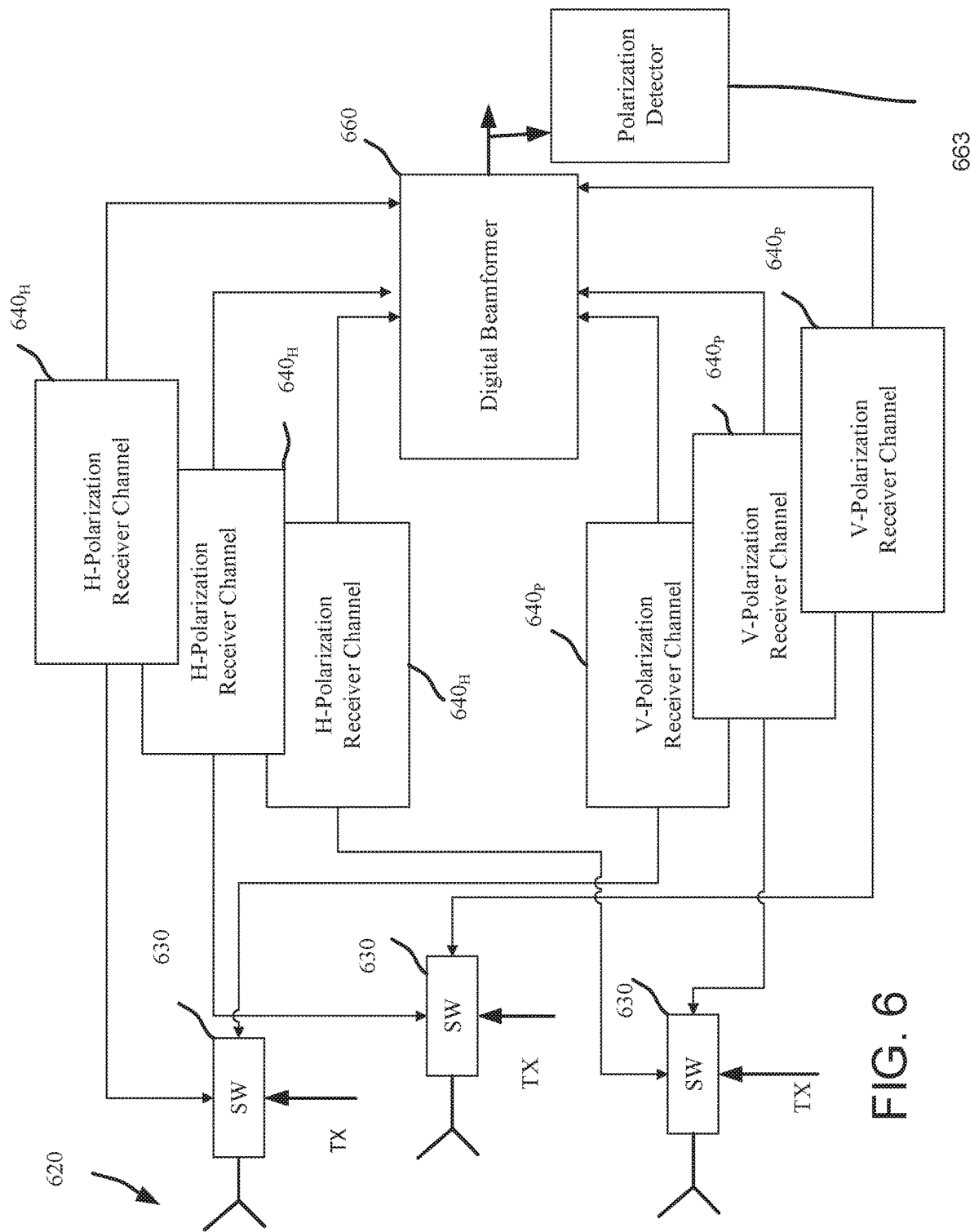
FIG. 6 illustrates a block diagram a wireless base station with H-polarization and V-polarization detection.

FIG. 6 illustrates a block diagram the wireless base station with H-polarization and V-polarization detection. The MBHSA antenna 620 (i.e., MBHSA antenna 120 of FIG. 1) may be configured with adaptive polarization matching wherein each antenna element may be configured for dual polarization. The three antennas shown are for an upper antenna element, the baseline antenna element and the lower antenna element latitudinally aligned. As shown in FIG. 5, each receiver channel is coupled to a respective one antenna element. However, each baseline antenna element may be coupled to an H-polarization receiver channel and V-polarization receiver channel. The switch 630 may alternate between the H-polarization receiver channel $640_H$ and V-polarization receiver channel $640_V$ to determine whether the target or mobile device is communicating according to an H-polarization or a P-polarization. The mobile device or target may also be communicating in other polarization schema such as, without limitation, circular polarization and elliptical polarization. Thus, the polarization detector 663 may determine which different polarization schema. For the sake of brevity, only a few switches, the H-polarization receiver channels and V-polarization receiver channels are shown to simplify the drawing.

The switch 630 may also select a transmit channel. The transmit channel may be dedicated to the switch 630. Alternately, a single transmit channel may be provided for the baseline antenna elements of the baseline circular antenna array. A single transmit channel may be provided for the lower antenna elements of the lower circular antenna array. A single transmit channel may be provided for the upper antenna elements of the upper circular antenna array. Still further, each antenna element coupled to switch 630 may have a dedicated H-polarization receiver channel, a dedicated V-polarization receiver channel and a dedicated transmit channel. The digital beamformer 660 sums the beams from the H-polarization receiver channels and the V-polarizations receiver channels The base station 115 may include a computing system 700. FIG. 7 illustrates a computing system 700 having a computing device 750. The computing device 750 may be a server. The computing device 750 may include one or more processors 752, system memory 753 and hard drive 754. Depending on the exact configuration and type of a computing device 750, system memory 753 may be volatile (such as RAM 756), non-volatile (such as read only memory (ROM 758), flash memory 760, and the like) or some combination thereof. System memory 753 may store operating system 764, one or more applications 775, and may include program data for performing one or more operations, functions, methods and processes described herein. At least one of the processors 752 may include a digital signal processor (DSP).

The applications 775 may include azimuth difference beamforming (DBF) program instructions 780 control the digital beamformer 560 to generate azimuth beamforming sum beams, including azimuth difference beams for each antenna element in the RBIS. The applications 775 may include elevation DBF program instructions 783 for controlling the digital beamformer 560 to generate elevation beamforming sum beams, including elevation difference beams for each antenna element of the RBIS. The applications 775 may include polarization DBF program instructions 781 for controlling the digital beamformer 660 to generate polarization beamforming sum signals, including polarization elevation and azimuth difference beams and corresponding primary beams for the H-polarization and the V-polarization.

The applications 775 may include primary beamforming (BF) program instructions 782 controls the digital beamformer 560 to generate sum beams for the primary beams for each RBIS. Thus, program instructions 780, 782 and 783 control the digital beamformer 560 to generate the sum beams for five correlated directive component beams of the antenna elements in each RBIS. The applications 775 may include command program instructions 784 for generating and assembling command signal packets with command and control messages directed to each corresponding mobile device controlled by the base station.

The applications 775 may include search and tracking program instructions 785 for searching and tracking each mobile device of a fleet for improved communications when delivering the command and control signals. The system is configured to continuously or nearly continuously generate the five correlated directive component beams of each RBIS for each instantiation. Thus, each instantiation of the RBIS values are configured to represent motion of the mobile device relative to the antenna 120. The applications 775 may include direction pointing program instructions 786 for directing command and control communication signals to a particular transmit antenna or other directive antenna based on the mobile devices elevation and azimuth.

The applications 775 may include message processing program instructions 788 for message processing of packets from responding mobile devices. The applications 775 may include switch control program instructions 789 for controlling the switches 530 or 630 to selectively receive or transmit using a particular antenna element. The switch control program instructions 789 may be substituted with instruction to control a circulator or other means for transitioning from a receive mode to a transmit mode of any particular one antenna element. The applications 775 may include interference cancellation program instructions 790 for adaptively performing interference cancelation using nulling control. The instructions 790 generate course weight adjustments 791 for each receiver channel by a course weight adjuster.

The applications 775 may include monopulse estimations program instructions 792 for controlling the digital beamformer 560 to determine monopulse estimations for the generation of refined weight adjustments by the refined weight adjuster 793. A signal conditioner 794 may be provided to enhance or increase the signal to noise ratios of the demodulated digital signals.

The computing device 750 may also have additional features or functionality. For example, the computing device 750 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by the computing device. Any such computer storage media may be part of the device.

The computing device 750 may also include or have user interfaces 762 for user input device(s) 770 such as a keyboard, mouse, pen, voice input device, touch input device, etc. The computing device 750 may include or have interfaces for connection to output device(s) such as at least one display device 740 via display drivers, speakers, etc. The computing device 750 may include a peripheral bus 766 for connecting to peripherals. The computing device 750 may contain communication connection(s) that allow the communication systems to communicate with other computing devices, such as over a network or a wireless network. By way of example, and not limitation, communication connection(s) and protocols may be compatible with wired media such as a wired network or direct-wired connection, and wireless media such as acoustic, radio frequency (RF), infrared and other wireless media of the communication system. The computing device 750 may include a network interface card 768 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

Figure 8B:
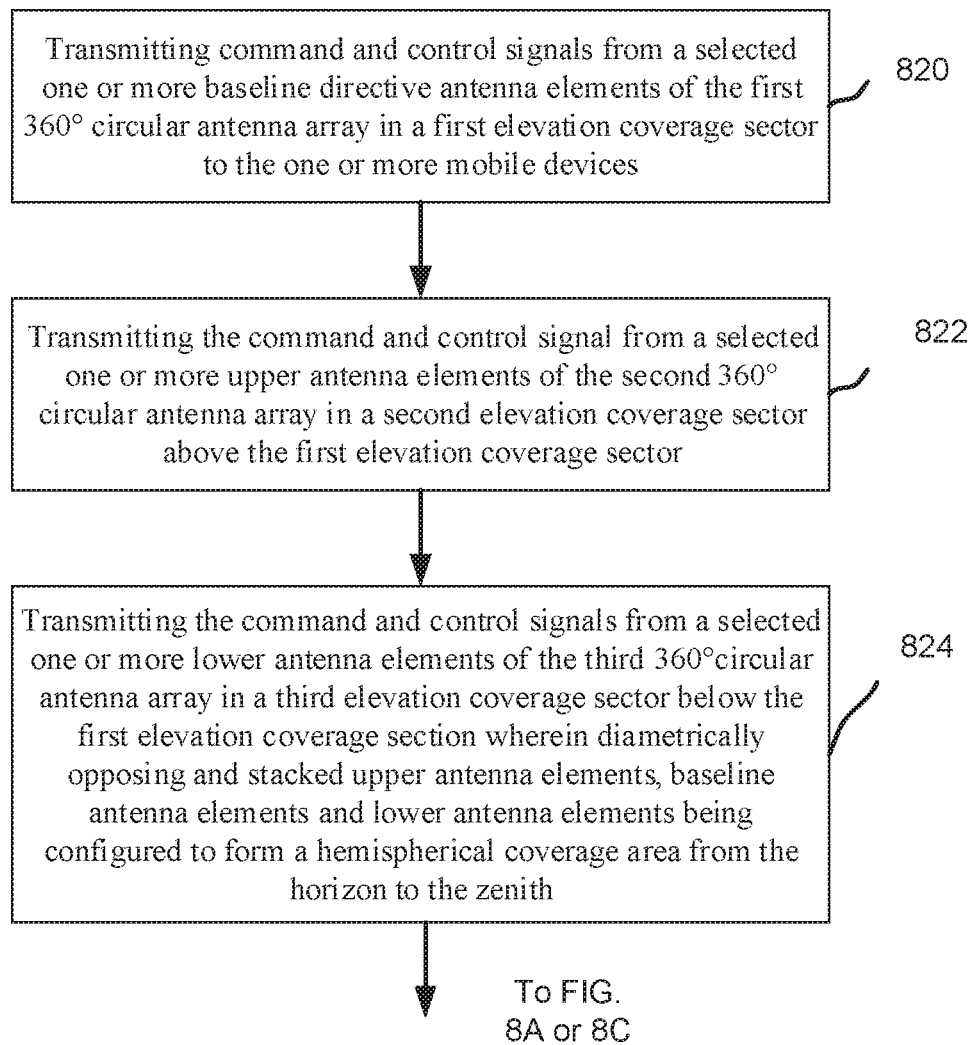
Figure 8C:
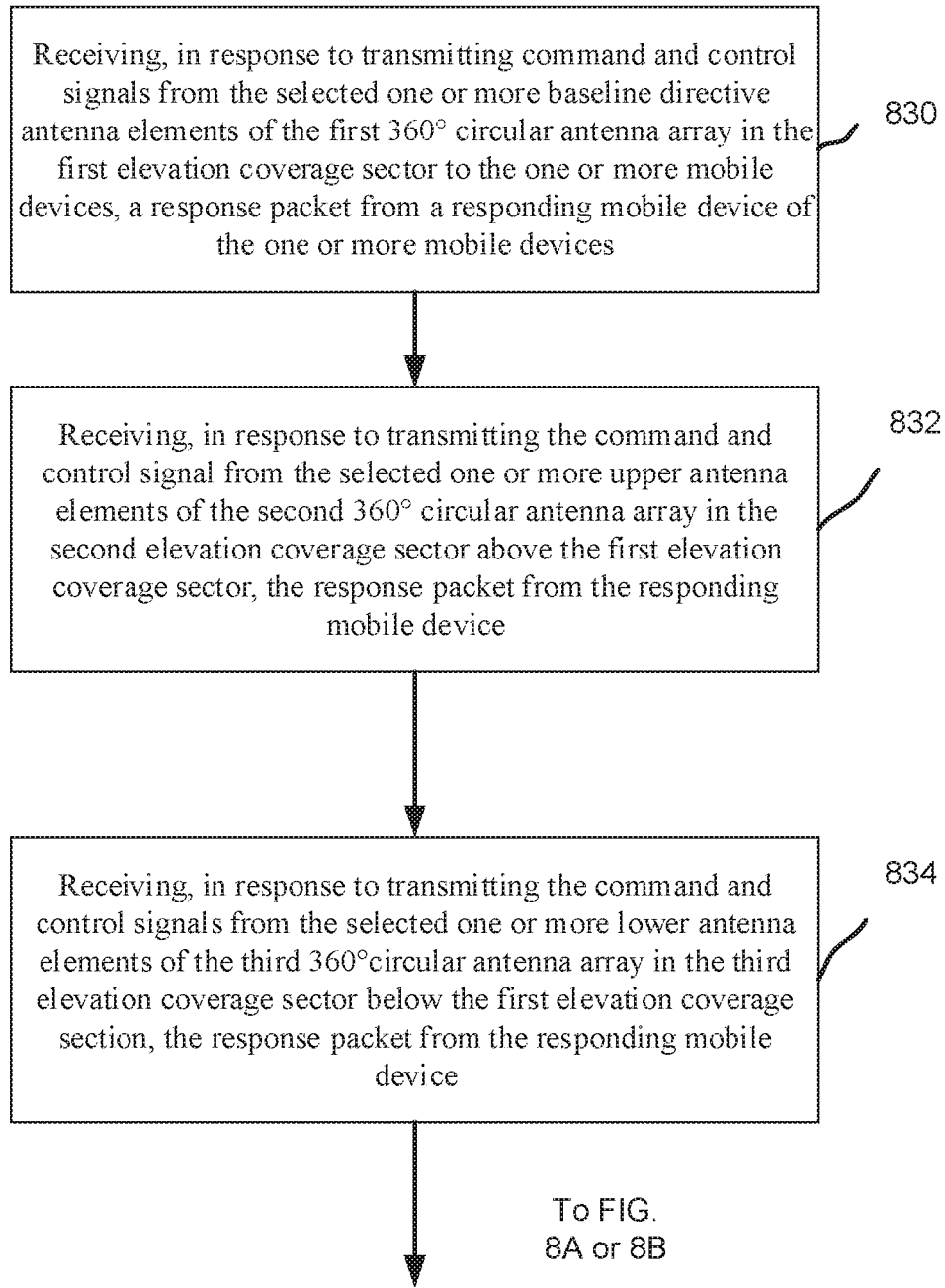

FIGS. 8A-8C illustrate a flowchart a method 800 for command and control of a plurality of mobile devices in a fleet with secondary radar functionality. The blocks of the flowchart may be performed in the order shown or a different order. The one or more of the blocks may be performed contemporaneously. Blocks may be added or omitted to carry out the method 800.

In reference to FIG. 8A, the method 800 may comprise, at block 802, determining for each antenna element of the set of baseline tilted directive antenna elements, arranged in a baseline 360° circular array, a baseline azimuth difference sum beam, a baseline elevation difference sum beam and a baseline primary sum beam using baseline azimuth difference beams, baseline elevation difference beams and baseline primary beams from a corresponding different contiguous subset of baseline antenna elements. The method 800 may comprise, at block 804, determining for each antenna element of the set of upper tilted directive antenna elements, arranged in an upper 360° circular array, an upper azimuth difference sum beam, an upper elevation difference sum beam and an upper primary sum beam using upper azimuth difference beams, upper elevation difference beams and upper primary beams from a corresponding different contiguous subset of upper antenna elements. The method 800 may comprise, at block 806, determining for each antenna element of the set of lower tilted directive antenna elements, arranged in a lower 360° circular array, a lower azimuth difference sum beam, a lower elevation difference sum beam and a lower primary sum beam using lower azimuth difference beams, lower elevation difference beams and lower primary beam from a corresponding different contiguous subset of lower antenna elements. The method 800 may comprise, at block 808, searching and tracking a plurality of mobile devices in response to a correlated azimuth and elevation based on received signal characteristics of the received signals from the baseline 360° circular array, the upper 360° circular array and the lower 360° circular array. The method 800 may be repeated for each subsequent instantiation.

In reference to FIG. 8B, the method 800 may further comprise, at block 820, transmitting command and control signals from one or more selected baseline tilted directive antenna elements of the first 360° circular antenna array in a first elevation coverage sector to the one or more mobile devices. The method 800 may comprise, at block 822, transmitting the command and control signal from a selected one or more upper antenna elements of the second 360° circular antenna array in a second elevation coverage sector above the first elevation coverage sector. The method 800 may comprise, at block 824, transmitting the command and control signals from a selected one or more lower antenna elements of the third 360° circular antenna array in a third elevation coverage sector below the first elevation coverage section wherein stacked upper antenna elements, baseline antenna elements and lower antenna elements being configured to form a hemispherical coverage area from the horizon to the zenith.

The beamforming blocks 802, 804 and 804 may be in response to a particular command and control signal sent from the wireless base station 115 to any of the mobile devices.

In reference to FIG. 8C, the method 800 may further comprise, at block 830, receiving, in response to transmitting command and control signals from the selected one or more baseline directive antenna elements of the first 360° circular antenna array in the first elevation coverage sector to the one or more mobile devices, a response packet from a responding mobile device of the one or more mobile devices. The method 800 may comprise, at block 832, receiving, in response to transmitting the command and control signal from the selected one or more upper antenna elements of the second 360° circular antenna array in the second elevation coverage sector above the first elevation coverage sector, the response packet from the responding mobile device.

The method 800 may comprise, at block 834, receiving, in response to transmitting the command and control signals from the selected one or more lower antenna elements of the third 360° circular antenna array in the third elevation coverage sector below the first elevation coverage section, the response packet from the responding mobile device.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A system, comprising:
 a multi-beam hemispherical array (MBHSA) antenna having a plurality of single circular row of antenna elements comprising a set of baseline directive antenna elements arranged sequentially in a first 360° circular antenna array, digitally summed using primary beam weights to form a primary sum beam, a set of upper tilted directive antenna elements arranged sequentially in a second 360° circular antenna array and being latitudinally aligned with the set of baseline directive antenna elements, and a set of lower tilted directive antenna elements arranged sequentially in a third 360° circular antenna array and being latitudinally aligned with the set of baseline directive antenna elements, wherein the set of upper tilted directive antenna elements and the set of lower tilted directive antenna elements are formed by changing weights applied to the received signals in memory using first and second azimuth forming weights to form azimuth difference sum beams wherein a received signal of an adjacent antenna element is further used to form at least one of the primary sum beam and the azimuth difference sum beams; and a wireless fleet base station including a plurality of non-shared receiver channels, each non-shared receiver channel being coupled to and dedicated to a particular antenna element of the first 360° circular array, the second 360° circular array and the third 360° circular array, the wireless fleet base station being configured to provide 360° of transmission and reception from horizon to zenith using the plurality of antenna elements for two-way command and control fleet communications to and from a plurality of mobile devices of a fleet and to provide secondary radar functions using the two-way command and control fleet communications to track the mobile devices based on received signal characteristics received at the plurality of antenna elements.

2. The system according to claim 1, wherein:

the first 360° circular antenna array transmits and receives in a first elevation coverage sector being a first portion of an area from the horizon to the zenith;

the second 360° circular antenna array transmits and receives in a second elevation coverage sector above the first elevation coverage sector and being a second portion of the area from the horizon to the zenith; and the third 360° circular antenna array transmits and receives in a third elevation coverage sector below the first elevation coverage section and being a third portion of the area from the horizon to the zenith, wherein the first, second and third 360° circular antenna arrays being configured to form a hemispherical coverage area from the horizon to the zenith and the first portion, second portion and third portion are different portions.

3. The system according to claim 2, wherein the plurality of non-shared receiver channels comprises:

a set of baseline receiver channels coupled to the first 360° circular antenna array;

a set of upper receiver channels coupled to the second 360° circular antenna array; and a set of lower receiver channels coupled to the third 360° circular antenna array; and wherein the wireless base station further comprising at least one beamformer configured to:

form baseline digital azimuth and elevation difference beams associated with the set of baseline receiver channels and baseline primary beams for determining an azimuth and elevation estimate of one or more of the plurality of mobile devices of the fleet relative to the first 360° circular antenna array;

form upper digital azimuth and elevation difference beams associated with the set of upper receiver channels and upper primary beams for determining an azimuth and elevation estimate of the one or more of the plurality of mobile devices of the fleet relative to the second 360° circular antenna array; and form lower digital azimuth and elevation difference beams coupled to the set of lower receiver channels and lower primary beams for determining an azimuth and elevation estimate of the one or more of the plurality of mobile devices of the fleet relative to the third 360° circular antenna array.

4. The system according to claim 3, wherein the at least one beamformer configured to:

determine for each antenna element of the set of baseline antenna elements a baseline azimuth difference sum beam, a baseline elevation difference sum beam and a baseline primary sum beam using the baseline azimuth difference beams, the baseline elevation difference beams and the baseline primary beams from a corresponding different contiguous subset of baseline antenna elements;

determine for each antenna element of the set of upper antenna elements an upper azimuth difference sum beam, an upper elevation difference sum beam and an upper primary sum beam using the upper azimuth difference beams, the upper elevation difference beams and the upper primary beams from a corresponding different contiguous subset of upper antenna elements; and determine for each antenna element of the set of lower antenna elements a lower azimuth difference sum beam, a lower elevation difference sum beam and a lower primary sum beam using the lower azimuth difference beams, the lower elevation difference beams and the lower primary beams from a corresponding different contiguous subset of lower antenna elements.

5. The system according to claim 3, wherein the wireless fleet base station comprises:

a first transmit channel selectively coupled to one or more of the baseline antenna elements of the first 360° circular array;

a second transmit channel selectively coupled to one or more of the upper antenna elements of the second 360° circular array; and a third transmit channel selectively coupled to one or more of the lower antenna elements of the third 360° circular array.

6. The system according to claim 1, wherein the wireless fleet base station configured to, per instantiation, form monopulse angle estimations and adaptive interference cancellation using communications from the plurality of mobile devices in a hemispherical coverage area and to search and track each mobile device of the plurality of mobile devices using the two-way command and control fleet communications.

7. The system according to claim 1, further comprising the plurality of mobile devices, the plurality of mobile device including an unmanned airborne vehicle device.

8. An antenna, comprising:

a plurality of baseline directive of single circular row of antenna elements arranged sequentially in a first 360° circular antenna array at a first tilt which receives signals in a first elevation coverage sector associated with the first tilt between horizon to zenith, wherein a received signal in the first elevation coverage sector at a first antenna element of the antenna elements is used to form the received signal at an adjacent second antenna element;

a plurality of upper tilted directive of single circular row of antenna elements arranged sequentially in a second 360° circular antenna array at a second tilt which receives signals in a second elevation coverage sector associated with the second tilt between the horizon to the zenith and latitudinally aligned with the plurality of baseline directive antenna elements, wherein a received signal in the second elevation coverage sector at the first antenna element of the antenna elements is used to form the received signal at the adjacent second antenna element; and a plurality of lower tilted directive of single circular row of antenna elements arranged sequentially in a third 360° circular antenna array at a third tilt which receives signal in a third elevation coverage sector associated with the third tilt between the horizon and the zenith and latitudinally aligned with the plurality of baseline directive antenna elements, wherein a received signal in the third elevation coverage sector at the first antenna element of the antenna elements is used to form the received signal at the adjacent second antenna element;

wherein the first 360° circular array, the second 360° circular array and the third 360° circular array being selectively controlled to provide 360° of reception of wireless signals from the horizon to the zenith from a plurality of mobile devices of a fleet in response to command and control fleet communications and to provide secondary radar functions using the command and control fleet communications to search for and track the plurality of mobile devices based on received signal characteristics associated with the first 360° circular array, the second 360° circular array and the third 360° circular array, wherein a received signal of an adjacent antenna element is further used to form at least one of the primary sum beam and the azimuth difference sum beams.

9. The antenna according to claim 8, wherein:
stacked upper antenna elements, baseline antenna elements and lower antenna elements of the first 360° circular array, the second 360° circular array and the third 360° circular array, respectively, being configured to form a hemispherical coverage area from the horizon to the zenith.

10. The antenna according to claim 8, wherein:
the plurality of baseline directive antenna elements is configured for dual polarization in a first elevation coverage sector;
the plurality of upper tilted directive antenna elements is configured for dual polarization in a second elevation coverage sector above the first elevation coverage sector; and
the plurality of lower tilted directive antenna elements is configured for dual polarization in a third elevation coverage sector below the first elevation coverage section.

11. The antenna according to claim 8, wherein the first 360° circular array, the second 360° circular array and the third 360° circular array being selectively controlled to provide both transmission and reception of wireless signals from the horizon to the zenith in 360° for two-way command and control fleet communications to and from the plurality of mobile devices of the fleet and to provide the secondary radar functions using the two-way command and control fleet communications to search for and track the plurality of mobile devices.

12. The antenna according to claim 8, further comprising transmit antenna elements arranged sequentially in a fourth 360° circular antenna array, each transmit antenna element being latitudinally aligned with a corresponding baseline antenna element.

13. A method, comprising the steps of:
a) determining for each antenna element of the set of single circular row of baseline tilted directive antenna elements, arranged in a baseline 360° circular array, a baseline azimuth difference sum beam, a baseline elevation difference sum beam and a baseline primary sum beam using baseline azimuth difference beams, baseline elevation difference beams and baseline primary beams from a corresponding different contiguous subset of baseline antenna elements, wherein a received signal of an adjacent antenna element is further used to determine at least one of the primary sum beam and the azimuth difference sum beams, with a non-transitory computer software operable in a processor;
b) determining for each antenna element of the set of single circular row of upper tilted directive antenna elements, arranged in an upper 360° circular array, an upper azimuth difference sum beam, an upper elevation difference sum beam and an upper primary sum beam using upper azimuth difference beams, upper elevation difference beams and upper primary beams from a corresponding different contiguous subset of upper antenna elements, wherein a received signal of the adjacent antenna element is further used to determine at least one of the upper primary sum beam and the upper azimuth difference sum beams with a non-transitory computer software operable in a processor;
c) determining for each antenna element of the set of single circular row of lower tilted directive antenna elements, arranged in a lower 360° circular array, a lower azimuth difference sum beam, a lower elevation difference sum beam and a lower primary sum beam using lower azimuth difference beams, lower elevation difference beams and lower primary beam from a corresponding different contiguous subset of lower antenna elements, wherein a received signal of an adjacent antenna element is further used to determine at least one of the lower primary sum beam and the lower azimuth difference sum beams with a non-transitory computer software operable in a processor;
d) searching and tracking a plurality of mobile devices in response to a correlated azimuth and elevation based on received signal characteristics of the received signals from the baseline 360° circular array, the upper 360° circular array and the lower 360° circular array with a non-transitory computer software operable in a processor; and
e) repeating steps a)-d) for each subsequent instantiation.

14. The method according to claim 13, further comprising the steps of:
transmitting command and control signals from one or more selected baseline directive antenna elements of the baseline 360° circular antenna array in a first elevation coverage sector to at least one mobile device with a non-transitory computer software operable in a processor;
transmitting the command and control signal from one or more selected upper directive antenna elements of the upper 360° circular antenna array in a second elevation coverage sector above the first elevation coverage sector with a non-transitory computer software operable in a processor; and transmitting the command and control signals from one or more selected lower directive antenna elements of the lower 360° circular antenna array in a third elevation coverage sector below the first elevation coverage section wherein stacked upper antenna elements, baseline antenna elements and lower antenna elements being configured to form a hemispherical coverage area from the horizon to the zenith with a non-transitory computer software operable in a processor.

15. The method according to claim 14, further comprising the steps of:

receiving, in response to transmitting command and control signals from the selected one or more baseline directive antenna elements of the first 360° circular antenna array in the first elevation coverage sector to one or more mobile devices, a first response packet from at least one first responding mobile device;

receiving, in response to transmitting the command and control signal from the selected one or more upper antenna elements of the second 360° circular antenna array in the second elevation coverage sector above the first elevation coverage sector, a second response packet from at least one second responding mobile device; and receiving, in response to transmitting the command and control signals from the selected one or more lower antenna elements of the third 360° circular antenna array in the third elevation coverage sector below the first elevation coverage section, a third response packet from at least one third responding mobile device.

16. The method according to claim 15, wherein the step d) is based on the first response packet, the second response packet and the third response packet.

17. The method according to claim 13, wherein the searching and tracking of the plurality of mobile devices comprises search and tracking of a plurality of unmanned airborne vehicle devices in flight.

18. The method according to claim 13, further comprising the step of:

cancelling interference received the baseline 360° circular antenna array, the upper 360° circular antenna array and the lower 360° circular antenna array based on the received signal characteristics of the received signals.

19. The method according to claim 18, wherein the interference comprises jamming signal interference.

* * * * *